US012712822B1

(12) United States Patent
Chougule et al.

(10) Patent No.: US 12,712,822 B1
(45) Date of Patent: Aug. 18, 2026

(54) FIFO BANK SELECTION

(71) Applicant: Marvell Asia Pte Ltd, Singapore (SG)

(72) Inventors: Vijay Chougule, Tracy, CA (US); Ajit Kumar Jain, Milpitas, CA (US)

(73) Assignee: Marvell Asia Pte Ltd, Singapore (SG)

( * ) Notice: Subject to any disclaimer, the term of this patent is extended or adjusted under 35 U.S.C. 154(b) by 288 days.

(21) Appl. No.: 18/413,667

(22) Filed: Jan. 16, 2024

Related U.S. Application Data

(60) Provisional application No. 63/439,573, filed on Jan. 17, 2023.

(51) Int. Cl.
*H04L 47/62* (2022.01)
*H04L 49/9005* (2022.01)

(52) U.S. Cl.
CPC ...... *H04L 47/6245* (2013.01); *H04L 49/9005* (2013.01)

(58) Field of Classification Search
CPC ............... H04L 47/6245; H04L 45/742; H04L 49/3018; H04L 49/3027; H04L 49/90; H04L 49/901; H04L 49/9005; H04L 49/9023; H04L 49/9047; H04L 49/9057; H04L 49/9094; H04L 2012/5681; G06F 12/02
See application file for complete search history.

(56) References Cited

U.S. PATENT DOCUMENTS 10,868,768 B1 * 12/2020 Matthews ............... H04L 47/32
2010/0103762 A1 * 4/2010 Tzou ........................ G11C 8/12 365/230.06
2013/0212296 A1 * 8/2013 Goel ..................... H04L 45/742 709/238
2014/0331021 A1 * 11/2014 Kim ...................... G06F 13/161 711/167
2022/0051706 A1 * 2/2022 Lu ........................ G11C 7/1078

* cited by examiner

*Primary Examiner* — Kan Yuen
(74) *Attorney, Agent, or Firm* — Shield Intellectual Property PC; Zhichong Gu

(57) ABSTRACT

At a current clock cycle, a request is received for storing first-in-first-out (FIFO) buffer data portions in a FIFO buffer implemented with memory banks. In response to the request, memory bank selection methods are applied to select memory banks ordered in a first sequential order. It is determined whether the selected memory banks as ordered in the first sequential order starts with a first memory bank identical to a last memory bank written in a last clock cycle. IF SO, the first memory bank is swapped with a second memory bank immediately following the first memory bank in the first sequential order to generate a second sequential order. Writes is performed to store the FIFO buffer data portions into the selected memory banks in accordance with the second sequential order.

21 Claims, 8 Drawing Sheets

100
110a Node A
110b Node B
110c Node C
110d Node D
110e Node E
110f Node F
110g Node G
110h Node H
110i Node I
110j Node J
110n Node N 302
M writes
304
Initial Bank selection
306
Swap decision
308
M banks selected
Banks >= (N+M)
314
Status memory
318
316
300
312
N reads 302
M writes
Initial Bank selection
304
Swap decision
306
M banks selected
308
Banks >= (N+M)
Status memory
314
316
318-1
N reads
312
300-1

FIG. 4B

| Cycle | Bank Reads | Available banks (after read bank removal) | Initial Bank assigned | Initial First Bank | WR Bank Vec | swap | Saved Last Bank | Comment |
|---|---|---|---|---|---|---|---|---|
| 1 | {4,2} | {5,3,1,0) | {5,1,0) | 0 | {100011} | 0 | 5 | |
| 2 | {5,4} | {3,2,1,0} | {2,1,0} | 0 | {000111} | 0 | 2 | Last bank (5) not equal to first initially allocated bank (0), swap=0 |
| 3 | {1,0} | {5,4,2} | {5,4,2} | 2 | {110100} | 1 | 5 | Bank 3 is full and cannot be allocated<br>Last bank (2) equal to first initially allocated bank (2), swap=1<br>Bank 4 is read first |

receive a request for storing FIFO buffer data portions 502 select memory banks ordered in a first sequential order 504 determine whether the first write memory bank is the same as the last write memory bank in the last clock cycle 506 if so, swap the first and second write memory banks to generate a second sequential order 508 perform writes to the selected memory banks in accordance with the second sequential order 510

Figure 6:
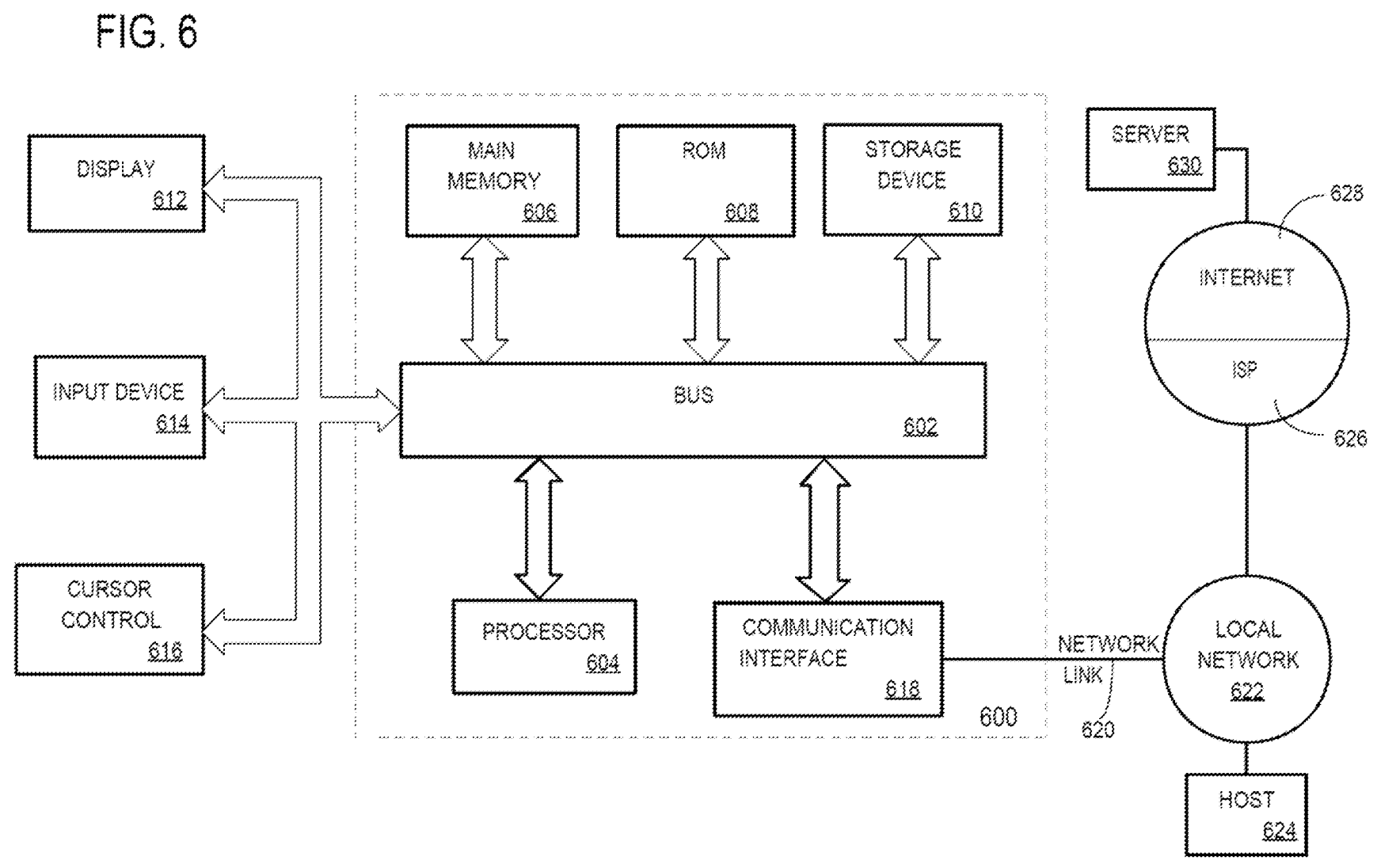

MAIN MEMORY 606

ROM 608

STORAGE DEVICE 610

BUS 602

PROCESSOR 604

COMMUNICATION INTERFACE 618

NETWORK LINK 620

LOCAL NETWORK 622

HOST 624

INTERNET 628

ISP 626

SERVER 630

DISPLAY 612

INPUT DEVICE 614

CURSOR CONTROL 616

FIFO BANK SELECTION

CROSS-REFERENCE TO RELATED APPLICATIONS

This application claims the benefit of priority to U.S. Provisional Patent Application No. 63/439,573 filed on 17 Jan. 2023, which is hereby incorporated by reference.

TECHNICAL FIELD

Embodiments relate generally to packet delivery, and, more specifically, to multi-bank FIFO.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

FIFO (First In First Out) refers to how data items are queued or dequeued with respect to a data buffer or queue. The first data item queued into a FIFO buffer or queue is also the first data item dequeued from the FIFO buffer or queue. The FIFO buffer or queue may be simply referred to as a FIFO.

Minimizing latencies in FIFO operations is typically a quite significant goal in a wide variety of computing applications. As more and more high capacity computing applications are being deployed in the field, time budgets available for queuing and dequeuing with respect to FIFOs are getting shorter and shorter. While these FIFOs may be nominally or theoretically of high capacities or bandwidths for concurrent FIFO reads and writes, much of such high capacities or bandwidths could still be wasted in operations.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 4B illustrates example status memory entries written for different reference clock cycles;

FIG. 5 illustrates an example process flow; and

FIG. 6 is a block diagram of an example computer system.

DETAILED DESCRIPTION

Figure 1:
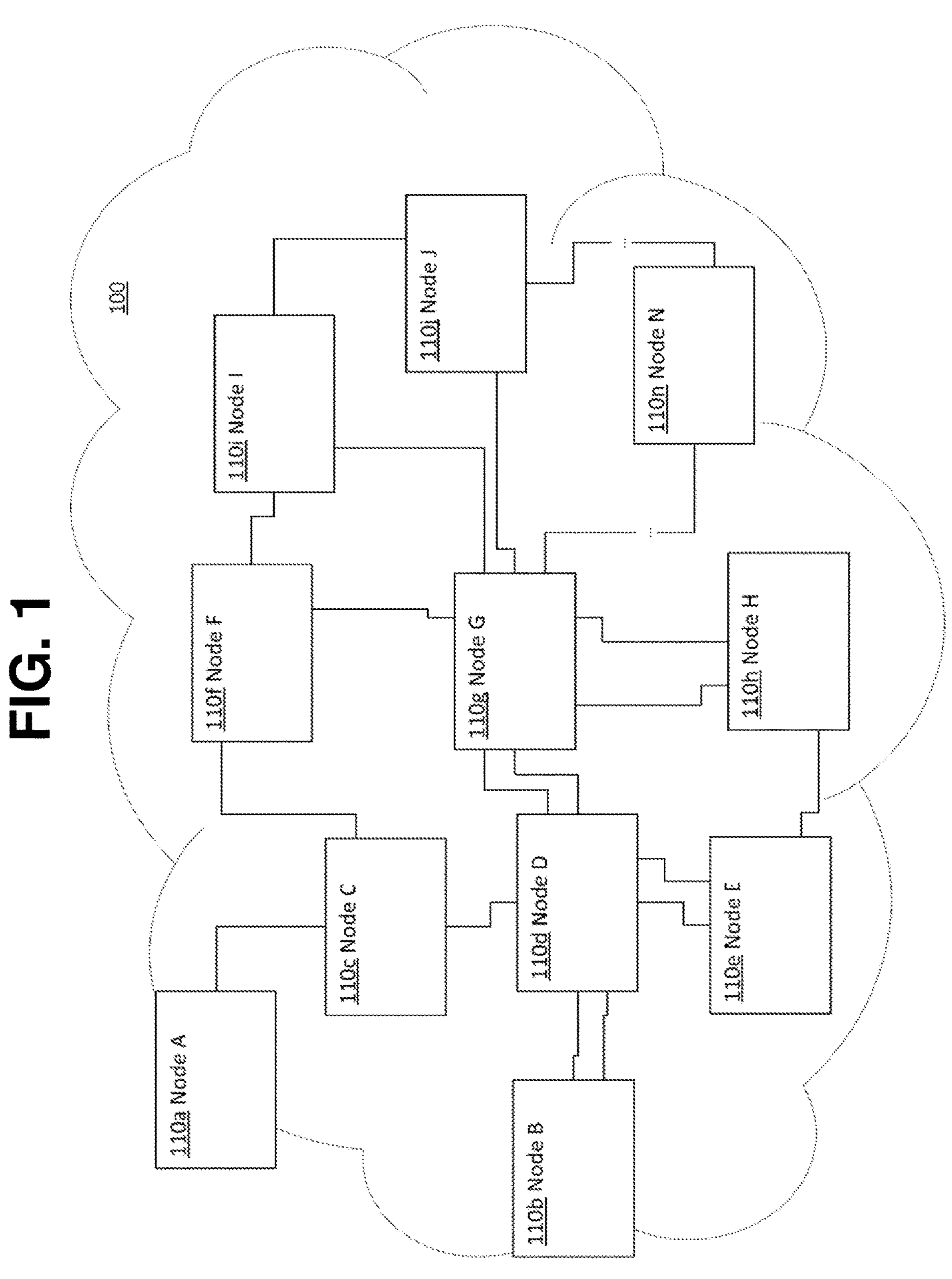
FIG. 1 illustrates example networking systems.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
2.1. Data Units
2.2 Network Paths
2.3 Network Device
2.4 Ports
2.5. Packet Processors
2.6 Buffers
2.7. Queues
2.8. Traffic Management
2.9. Forwarding Logic
2.10. Multi-bank FIFO
2.11. Miscellaneous
3.0. Functional Overview
3.1 Successive Write Cycles
3.2. Swap Decision
3.3. Data Burst and Chunks
3.4. Status Memory and Matrix
3.5. Writes with No Conflict
3.6. Writes with Conflict
3.7. Reading Operations
4.0. Example Embodiments
5.0. Implementation Mechanism—Hardware Overview
6.0. Extensions and Alternatives

1.0. GENERAL OVERVIEW

Techniques as described herein can be implemented in a system that supports FIFO read and write operations with respect to a multi-bank FIFO (queue/buffer) at a relatively high speed and concurrency. The multi-bank FIFO includes multiple memory banks, each of which may include multiple memory entries.

In some operational scenarios, the memory banks may be single-port memory bank with which a write or a read, but not both, can be performed in a given clock cycle. These banks can support M writes and N reads in a clock cycle, where M and N are positive integers no less than zero and the sum (M+N) is no greater than T representing the total number of banks in the multi-bank FIFO.

At any given clock cycle, reads from the multi-bank FIFO may be given or assigned higher priority over writes into the multi-bank FIFO. Hence, writes in a clock cycle can go to any banks selected by bank selection algorithm(s) if these banks are not accessed by reads in the same clock cycle.

In operation, a FIFO (write) data burst or entry can be broken into small chunks or FIFO data portions. Each chunk or FIFO data portion may be written to a separate memory entry in a separate bank in the multi-bank FIFO.

To support a relatively high concurrency and use memory banks relatively efficiently, writes in two successive write cycles may not include two successive writes into the same bank, which otherwise would force two (subsequent) successive reads from that bank to be performed in two successive read cycles, or alternatively which would cause an extra memory bank to be allocated or unused.

Under techniques as described herein, an initial selection may be made to select banks for writes in a given clock cycle. These initially selected banks are identified or determined from banks that are not directed to by reads (or read operations) in the same clock cycle.

A swap decision may be subsequently made to determine whether the very first two of the initially selected banks are to be swapped to avoid directing two successive writes in two successive write cycles to the same bank.

If there is only a single chunk or a single FIFO data portion in the FIFO data burst to be written into the multi-bank FIFO, then the swap decision is determined to be negative.

If there are more than one chunk or more than one FIFO data portion in the FIFO data burst to be written into the multi-bank FIFO, AND if the very last bank in the last write cycle immediately preceding the (current) write cycle is different from the very first bank initially selected in the (current) cycle, then the swap decision is also determined to be negative. In this case, the order used to perform the writes in the current cycle will follow a canonical order such as from the rightmost bank to the leftmost bank, from the lowest bank number to the highest bank number, etc.

However, if there are more than one chunk or more than one FIFO data portion in the FIFO data burst to be written into the multi-bank FIFO, AND if the very last bank in the last write cycle immediately preceding the (current) write cycle is the same as the very first bank initially selected in the (current) cycle, then the swap decision is determined to be positive. In this case, the order used to perform the writes in the current cycle will not follow a canonical order such as from the rightmost bank to the leftmost bank, from the lowest bank number to the highest bank number, etc. Rather, the writes in the current cycle will be performed with a non-canonical order in which the very first two of the initially selected banks are swapped and any remaining initially selected banks stays in the same positions as in the canonical order.

Under techniques as described herein, the initial selected banks and the swap decision may be efficiently captured or represented in a status memory entry or row written into a status matrix for each write cycle in a time sequential manner. More specifically, the status memory entry includes a bit vectors whose bits have a 1-1 correspondence with all the banks in the multi-bank FIFO. The status memory entry further includes a swap bit to indicate whether the swap decision is positive or negative.

Approaches, techniques, and mechanisms are disclosed for performing FIFO reads and writes with relatively high efficiency and concurrency. At a current clock cycle, a request is received for storing a set of first-in-first-out (FIFO) buffer data portions in a FIFO buffer implemented with a plurality of memory banks. The plurality of memory banks includes a plurality of sets of memory entries. Each memory bank in the plurality of memory banks includes a respective set of memory entries in the plurality of sets of multiple memory entries. In response to the request for storing the set of FIFO buffer data portions, one or more memory bank selection methods are applied to select, from among the plurality of memory banks, a set of memory banks ordered in a first sequential order. It is determined whether the set of memory banks as ordered in the first sequential order starts with a first memory bank identical to a last memory bank written in a last clock cycle. The last clock cycle immediately precedes the current clock cycle. A last sequential order used to order a last set of memory banks selected for a last set of writes in the last clock cycle ends with the last memory bank. In response to determining that the set of memory banks as ordered in the first sequential order starts with the first memory bank identical to the last memory bank written in the last clock cycle, the first memory bank is swapped with a second memory bank immediately following the first memory bank in the first sequential order to generate a second sequential order for the set of memory banks. A set of writes is performed to store the plurality of FIFO buffer data portions into the set of memory banks in accordance with the second sequential order.

In other aspects, the inventive subject matter encompasses computer apparatuses and/or computer-readable media configured to carry out the foregoing techniques.

2.0. STRUCTURAL OVERVIEW

FIG. 1 illustrates example aspects of an example networking system 100, also referred to as a network, in which the techniques described herein may be practiced, according to an embodiment. Networking system 100 comprises a plurality of interconnected nodes 110*a*-110*n* (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

2.1. Data Units

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a unit of data at the network layer (e.g., a TCP segment, etc.) to a second node 110 over a path that includes an intermediate node 110. This unit of data may be broken into smaller units of data at various sublevels before it is transmitted from the first node 110. These smaller data units may be referred to as "subunits" or "portions" of the larger data unit.

For example, a TCP segment may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild certain subunits of data (e.g., frames and/or cells, etc.) and route those subunits to the second node 110 without ever composing the entire original data unit.

When a node 110 receives a unit of data, it typically examines addressing information within the unit of data (and/or other information within the unit of data) to determine how to process the unit. The addressing information may be, for instance, an Internet Protocol (IP) address, MPLS label, or any other suitable information. If the addressing information indicates that the receiving node 110 is not the destination for the data unit, the receiving node 110 may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the unit of data, a label to attach the unit of data, etc. In cases where multiple paths (e.g., over the same port, over different ports, etc.) to the destination node 110 are possible, the forwarding instructions may include information indicating a suitable approach for selecting one of those paths, or a path deemed to be the best path may already be defined.

Addressing information, flags, labels, and other metadata used for determining how to handle a data unit are typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g., a "five-tuple" combination of a source address, source port, destination address, destination port, and protocol, etc.). A flow is often intended to be sent in sequence, and network devices are therefore, in many operational scenarios, typically configured to send all data units within a given flow along a same path to ensure that the flow is received in sequence.

A node 110 may operate on network data at several different layers, and therefore view the same data as belonging to several different types of data units.

2.2. Network Paths

Any node in the depicted network 100 may communicate with any other node in the network 100 by sending data units through a series of nodes 110 and links, referred to as a path. For example, Node B (110*b*) may send data units to Node H (110*h*) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a data unit that it sends. Rather, the node 110 may simply be configured to calculate the best path for the data unit out of the device (e.g., which egress port it should send the data unit out on, etc.). When a node 110 receives a data unit that is not addressed directly to the node 110, based on header information associated with a data unit, such as path and/or destination information, the node 110 relays the data unit along to either the destination node 110, or a "next hop" node 110 that the node 110 calculates is in a better position to relay the data unit to the destination node 110. In this manner, the actual path of a data unit is product of each node 110 along the path making routing decisions about how best to move the data unit along to the destination node 110 identified by the data unit.

2.3. Network Device

Figure 2:
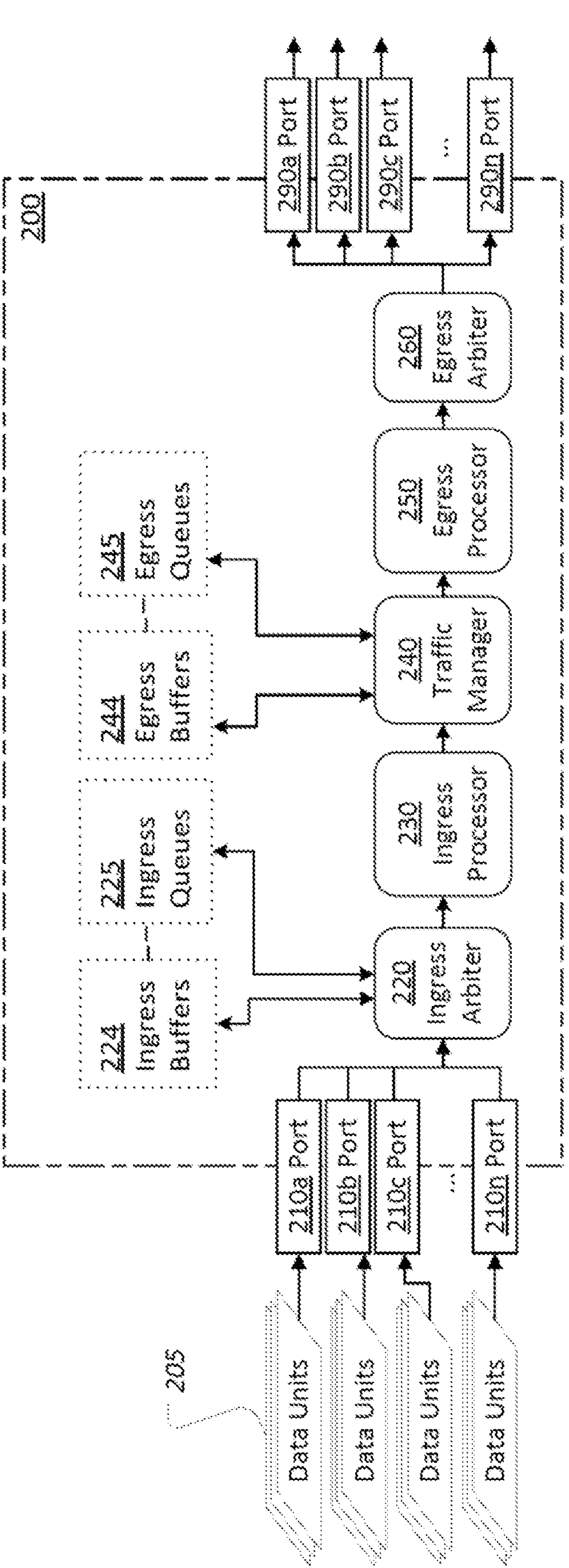
FIG. 2 illustrates an example network device.

FIG. 2 illustrates example aspects of an example network device 200 in which techniques described herein may be practiced, according to an embodiment. Network device 200 is a computing device comprising any combination of hardware and software configured to implement the various logical components described herein, including components 210-290. For example, the apparatus may be a single networking computing device, such as a router or switch, in which some or all of the components 210-290 described herein are implemented using application-specific integrated circuits (ASICs) or field programmable gate arrays (FPGAs). As another example, an implementing apparatus may include one or more memories storing instructions for implementing various components described herein, one or more hardware processors configured to execute the instructions stored in the one or more memories, and various data repositories in the one or more memories for storing data structures utilized and manipulated by various components 210-290.

Device 200 is generally configured to receive and forward data units 205 to other devices in a network, such as network 100, by means of a series of operations performed at various components within the device 200. Note that, in an embodiment, some or all of the nodes 110 in system such as network 100 may each be or include a separate network device 200. In an embodiment, a node 110 may include more than one device 200. In an embodiment, device 200 may itself be one of a number of components within a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip.

A non-limiting example flow of a data unit 205 through various subcomponents of the forwarding logic of device 200 is as follows. After being received via a port 210, a data unit 205 may be buffered in an ingress buffer 224 and queued in an ingress queue 225 by an ingress arbiter 220 until the data unit 205 can be processed by an ingress packet processor 230, and then delivered to an interconnect (or a cross connect) such as a switching fabric. From the interconnect, the data unit 205 may be forwarded to a traffic manager 240. The traffic manager 240 may store the data unit 205 in an egress buffer 244 and assign the data unit 205 to an egress queue 245. The traffic manager 240 manages the flow of the data unit 205 through the egress queue 245 until the data unit 205 is released to an egress packet processor 250. Depending on the processing, the traffic manager 240 may then assign the data unit 205 to another queue so that it may be processed by yet another egress processor 250, or the egress packet processor 250 may send the data unit 205 to an egress arbiter 260 which temporally stores or buffers the data unit 205 in a transmit buffer and finally forwards out the data unit via another port 290. Of course, depending on the embodiment, the forwarding logic may omit some of these subcomponents and/or include other subcomponents in varying arrangements.

Example components of a device 200 are now described in further detail.

2.4. Ports

Network device 200 includes ports 210/290. Ports 210, including ports 210-1 through 210-N, are inbound ("ingress") ports by which data units referred to herein as data units 205 are received over a network, such as network 110. Ports 290, including ports 290-1 through 290-N, are outbound ("egress") ports by which at least some of the data units 205 are sent out to other destinations within the network, after having been processed by the network device 200.

Egress ports 290 may operate with corresponding transmit buffers to store data units or subunits (e.g., packets, cells, frames, transmission units, etc.) divided therefrom that are to be transmitted through ports 290. Transmit buffers may have one-to-one correspondence relationships with ports 290, many-to-one correspondence with ports 290, and so on. Egress processors 250 or egress arbiters 260 operating with egress processors 250 may output these data units or subunits to transmit buffers before these units/subunits are transmitted out from ports 290.

Data units 205 may be of any suitable PDU type, such as packets, cells, frames, transmission units, etc. In an embodiment, data units 205 are packets. However, the individual atomic data units upon which the depicted components may operate may be actually be subunits of the data units 205. For example, data units 205 may be received, acted upon, and transmitted at a cell or frame level. These cells or frames-which may also be referred to as transfers—may be logically linked together as the data units 205 (e.g., packets, etc.) to which they respectively belong for purposes of determining how to handle the cells or frames. However, the subunits may not actually be assembled into data units 205 within device 200, particularly if the subunits are being forwarded to another destination through device 200.

Ports 210/290 are depicted as separate ports for illustrative purposes, but may actually correspond to the same physical hardware ports (e.g., network jacks or interfaces, etc.) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and a separate egress port 290. Moreover, for various functional purposes, certain logic of the network device 200 may subdivide a single physical ingress port or egress port into multiple ingress ports 210 or egress ports 290, or aggregate multiple physical ingress ports or egress ports into a single ingress port 210 or egress port 290. Hence, in some operational scenarios, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 230. On the other end, an egress packet processor 250 may input data units serially into another SerDes block, which outputs the data units in parallel to ports 290.

2.5. Packet Processors

A device 200 comprises one or more packet processing components that collectively implement forwarding logic by which the device 200 is configured to determine how to handle each data unit 205 that the device 200 receives. These packet processors components may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 230 and 250 may be configured to perform different packet processing tasks. These tasks may include, for example, identifying paths along which to forward data units 205, forwarding data units 205 to egress ports 290, implementing flow control and/or other policies, manipulating packets, performing statistical or debugging operations, and so forth. A device 200 may comprise any number of packet processors 230 and 250 configured to perform any number of processing tasks.

In an embodiment, the packet processors 230 and 250 within a device 200 may be arranged such that the output of one packet processor 230 or 250 may, eventually, be inputted into another packet processor 230 or 250, in such a manner as to pass data units 205 from certain packet processor(s) 230 and/or 250 to other packet processor(s) 230 and/or 250 in a sequence of stages, until finally disposing of the data units 205 (e.g., by sending the data units 205 out an egress port 290, "dropping" the data units 205, etc.). The exact set and/or sequence of packet processors 230 and/or 250 that process a given data unit 205 may vary, in some embodiments, depending on the attributes of the data unit 205 and/or the state of the device 200. There is no limit to the number of packet processors 230 and/or 250 that may be chained together in such a manner.

Based on decisions made while processing a data unit 205, a packet processor 230 or 250 may, in some embodiments, and/or for certain processing tasks, manipulate a data unit 205 directly. For instance, the packet processor 230 or 250 may add, delete, or modify information in a data unit header or payload. In other embodiments, and/or for other processing tasks, a packet processor 230 or 250 may generate control information that accompanies the data unit 205, or is merged with the data unit 205, as the data unit 205 continues through the device 200. This control information may then be utilized by other components of the device 200 to implement decisions made by the packet processor 230 or 250.

In an embodiment, a packet processor 230 or 250 need not necessarily process an entire data unit 205, but may rather only receive and process a subunit of a data unit 205 comprising header information for the data unit. For instance, if the data unit 205 is a packet comprising multiple cells, the first cell, or a first subset of cells, might be forwarded to a packet processor 230 or 250, while the remaining cells of the packet (and potentially the first cell(s) as well) are forwarded in parallel to a merger component where they await results of the processing.

Ingress and Egress Processors

In an embodiment, a packet processor may be generally classified as an ingress packet processor 230 or an egress packet processor 250. Generally, an ingress processor 230 resolves destinations for a traffic manager 240 to determine which ports 290 and/or queues a data unit 205 should depart from. There may be any number of ingress processors 230, including just a single ingress processor 230.

In an embodiment, an ingress processor 230 performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of data units 205, making initial categorizations of data units 205, and so forth. Once the appropriate intake task(s) have been performed, the data units 205 are forwarded to an appropriate traffic manager 240, to which the ingress processor 230 may be coupled directly or via various other components, such as an interconnect component.

The egress packet processor(s) 250 of a device 200, by contrast, may be configured to perform non-intake tasks necessary to implement the forwarding logic of the device 200. These tasks may include, for example, tasks such as identifying paths along which to forward the data units 205, implementing flow control and/or other policies, manipulating data units, performing statistical or debugging operations, and so forth. In an embodiment, there may be different egress packet processors(s) 250 assigned to different flows or other categories of traffic, such that not all data units 205 will be processed by the same egress packet processor 250.

In an embodiment, each egress processor 250 is coupled to a different group of egress ports 290 to which they may send data units 205 processed by the egress processor 250. In an embodiment, access to a group of ports 290 or corresponding transmit buffers 280 for the ports 290 may be regulated via an egress arbiter coupled to the egress packet processor 250. In some embodiments, an egress processor 250 may also or instead be coupled to other potential destinations, such as an internal central processing unit, a storage subsystem, or a traffic manager 240.

2.6. Buffers

Since not all data units 205 received by the device 200 can be processed by component(s) such as the packet processor (s) 230 and/or 250 and/or ports 290 at the same time, various components of device 200 may temporarily store data units 205 in memory structures referred to as (e.g., ingress, egress, etc.) buffers while the data units 205 are waiting to be processed. For example, a certain packet processor 230 or 250 or port 290 may only be capable of processing a certain amount of data such as a certain number of data units 205, or portions of data units 205, in a given clock cycle, meaning that other data units 205, or portions of data units 205, destined for the packet processor 230 or 250 or port 290 must either be ignored (e.g., dropped, etc.) or stored. At any given time, a large number of data units 205 may be stored in the buffers of the device 200, depending on network traffic conditions.

A device 200 may include a variety of buffers, each utilized for varying purposes and/or components. Generally, a data unit 205 awaiting processing by a component is held in a buffer associated with that component until the data unit 205 is "released" to the component for processing.

Buffers may be implemented using any number of distinct banks of memory. Each bank may be a portion of any type of memory, including volatile memory and/or non-volatile memory. In an embodiment, each bank comprises many addressable "entries" (e.g., rows, columns, etc.) in which data units 205, subunits, linking data, or other types of data, may be stored. The size of each entry in a given bank is known as the "width" of the bank, while the number of entries in the bank is known as the "depth" of the bank. The number of banks may vary depending on the embodiment.

Each bank may have associated access limitations. For instance, a bank may be implemented using single-ported memories that may only be accessed once in a given time slot (e.g., clock cycle, etc.). Hence, the device 200 may be configured to ensure that no more than one entry need be read from or written to the bank in a given time slot. A bank may instead be implemented in a multi-ported memory to support two or more accesses in a given time slot. However, single-ported memories may be desirable in many cases for higher operating frequencies and/or reducing costs.

In an embodiment, in addition to buffer banks, a device may be configured to aggregate certain banks together into logical banks that support additional reads or writes in a time slot and/or higher write bandwidth. In an embodiment, each bank, whether logical or physical or of another (e.g., addressable, hierarchical, multi-level, sub bank, etc.) organization structure, is capable of being accessed concurrently with each other bank in a same clock cycle, though full realization of this capability is not necessary.

Some or all of the components in device 200 that utilize one or more buffers may include a buffer manager configured to manage use of those buffer(s). Among other processing tasks, the buffer manager may, for example, maintain a mapping of data units 205 to buffer entries in which data for those data units 205 is stored, determine when a data unit 205 must be dropped because it cannot be stored in a buffer, perform garbage collection on buffer entries for data units 205 (or portions thereof) that are no longer needed, and so forth.

A buffer manager may include buffer assignment logic. The buffer assignment logic is configured to identify which buffer entry or entries should be utilized to store a given data unit 205, or portion thereof. In some embodiments, each data unit 205 is stored in a single entry. In yet other embodiments, a data unit 205 is received as, or divided into, constituent data unit portions for storage purposes. The buffers may store these constituent portions separately (e.g., not at the same address location or even within the same bank, etc.). The one or more buffer entries in which a data unit 205 are stored are marked as utilized (e.g., in a "free" list, free or available if not marked as utilized, etc.) to prevent newly received data units 205 from overwriting data units 205 that are already buffered. After a data unit 205 is released from the buffer, the one or more entries in which the data unit 205 is buffered may then be marked as available for storing new data units 205.

In some embodiments, the buffer assignment logic is relatively simple, in that data units 205 or data unit portions are assigned to banks and/or specific entries within those banks randomly or using a round-robin approach. In some embodiments, data units 205 are assigned to buffers at least partially based on characteristics of those data units 205, such as corresponding traffic flows, destination addresses, source addresses, ingress ports, and/or other metadata. For example, different banks may be utilized to store data units 205 received from different ports 210 or sets of ports 210. In an embodiment, the buffer assignment logic also or instead utilizes buffer state information, such as utilization metrics, to determine which bank and/or buffer entry to assign to a data unit 205, or portion thereof. Other assignment considerations may include buffer assignment rules (e.g., no writing two consecutive cells from the same packet to the same bank, etc.) and I/O scheduling conflicts, for example, to avoid assigning a data unit to a bank when there are no available write operations to that bank on account of other components reading content already in the bank.

2.7. Queues

In an embodiment, to manage the order in which data units 205 are processed from the buffers, various components of a device 200 may implement queueing logic. For example, the flow of data units through ingress buffers may be managed using ingress queues while the flow of data units through egress buffers may be managed using egress queues.

Each data unit 205, or the buffer locations(s) in which the data unit 205 is stored, is said to belong to one or more constructs referred to as queues. Typically, a queue is a set of memory locations (e.g., in the buffers, etc.) arranged in some order by metadata describing the queue. The memory locations may (and often are) non-contiguous relative to their addressing scheme and/or physical or logical arrangement. For example, the metadata for one queue may indicate that the queue is comprised of, in order, entry addresses 2, 50, 3, and 82 in a certain buffer.

In many embodiments, the sequence in which the queue arranges its constituent data units 205 generally corresponds to the order in which the data units 205 or data unit portions in the queue will be released and processed. Such queues are known as first-in-first-out ("FIFO") queues, though in other embodiments other types of queues may be utilized. In some embodiments, the number of data units 205 or data unit portions assigned to a given queue at a given time may be limited, either globally or on a per-queue basis, and this limit may change over time.

2.8. Traffic Management

According to an embodiment, a device 200 further includes one or more traffic managers 240 configured to control the flow of data units to one or more packet processor(s) 230 and/or 250. For instance, a buffer manager within the traffic manager 240 may temporarily store data units 205 in buffers as they await processing by egress processor(s) 250. A traffic manager 240 may receive data units 205 directly from a port 210, from an ingress processor 230, and/or other suitable components of device 200. In an embodiment, the traffic manager 240 receives one TDU from each possible source (e.g. each port 210, etc.) each clock cycle or other time slot.

Traffic manager 240 may include or be coupled to egress buffers for buffering data units 205 prior to sending those data units 205 to their respective egress processor(s) 250. A buffer manager within the traffic manager 240 may temporarily store data units 205 in egress buffers as they await processing by egress processor(s) 250. The number of egress buffers may vary depending on the embodiment. A data unit 205 or data unit portion in an egress buffer may eventually be "released" to one or more egress processor(s) 250 for processing, by reading the data unit 205 from the (e.g., egress, etc.) buffer and sending the data unit 205 to the egress processor(s) 250. In an embodiment, traffic manager 240 may release up to a certain number of data units 205 from buffers to egress processors 250 each clock cycle or other defined time slot.

Beyond managing the use of buffers to store data units 205 (or copies thereof), a traffic manager 240 may include queue management logic configured to assign buffer entries to queues and manage the flow of data units 205 through the queues. The traffic manager 240 may, for instance, identify a specific queue to assign a data unit 205 to upon receipt of the data unit 205. The traffic manager 240 may further determine when to release—also referred to as "dequeuing"—data units 205 (or portions thereof) from queues and provide those data units 205 to specific packet processor(s) 250. Buffer management logic in the traffic manager 240 may further "deallocate" entries in a buffer that store data units 205 are no longer linked to the traffic manager's queues. These entries are then reclaimed for use in storing new data through a garbage collection process.

In an embodiment, different queues may exist for different destinations. For example, each port 210 and/or port 290 may have its own set of queues. The queue to which an incoming data unit 205 is assigned and linked may, for instance, be selected based on forwarding information indicating which port 290 the data unit 205 should depart from. In an embodiment, a different egress processor 250 may be associated with each different set of one or more queues. In an embodiment, the current processing context of the data unit 205 may be used to select which queue a data unit 205 should be assigned to.

In an embodiment, there may also or instead be different queues for different flows or sets of flows. That is, each identifiable traffic flow or group of traffic flows is assigned its own set of queues to which its data units 205 are respectively assigned. In an embodiment, different queues may correspond to different classes of traffic or quality-of-service (QoS) levels. Different queues may also or instead exist for any other suitable distinguishing properties of the data units 205, such as source address, destination address, packet type, and so forth.

Device 200 may comprise any number (e.g., one or more, etc.) of packet processors 230 and/or 250 and traffic managers 240. For instance, different sets of ports 210 and/or ports 290 may have their own traffic manager 240 and packet processors 230 and/or 250. As another example, in an embodiment, the traffic manager 240 may be duplicated for some or all of the stages of processing a data unit. For example, system 200 may include a traffic manager 240 and egress packet processor 250 for an egress stage performed upon the data unit 205 exiting the system 200, and/or a traffic manager 240 and packet processor 230 or 250 for any number of intermediate stages. The data unit 205 may thus pass through any number of traffic managers 240 and/or packet processors 230 and/or 250 prior to exiting the system 200. In other embodiments, only a single traffic manager 240 is needed. If intermediate processing is needed, flow of a data unit 205 may "loop back" to the traffic manager 240 for buffering and/or queuing after each stage of intermediate processing.

In an embodiment, a traffic manager 240 is coupled to the ingress packet processor(s) 230, such that data units 205 (or portions thereof) are assigned to buffers only upon being initially processed by an ingress packet processor 230. Once in an egress buffer, a data unit 205 (or portion thereof) may be "released" to one or more egress packet processor(s) 250 for processing, either by the traffic manager 240 sending a link or other suitable addressing information for the corresponding buffer to the egress packet processor 250, or by sending the data unit 205 directly.

In the course of processing a data unit 205, a device 200 may replicate a data unit 205 one or more times—for example, based on a copy count specified in control information for the data unit—for multi-destination purposes such as, without limitation, multicasting, mirroring, recirculation, debugging, and so forth. For example, a single data unit 205 may be replicated to multiple egress queues. For instance, a data unit 205 may be linked to separate queues for each of ports 1, 3, and 5. As another example, a data unit 205 may be replicated a number of times after it reaches the head of a queue (e.g., for different egress processors 250, etc.). Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual copy of the data unit 205 in buffers, or a single copy of the data unit 205 may be linked from a single buffer location to multiple queues at the same time.

2.9. Forwarding Logic

The logic by which a device 200 determines how to handle a data unit 205—such as where and whether to send a data unit 205, whether to perform additional processing on a data unit 205, etc.—is referred to as the forwarding logic of the device 200. This forwarding logic is collectively implemented by a variety of the components of the device 200, such as described above. For example, an ingress packet processor 230 may be responsible for resolving the destination of a data unit 205 and determining the set of actions/edits to perform on the data unit 205, and an egress packet processor 250 may perform the edits. Or, the egress packet processor 250 may also determine actions and resolve a destination in some cases. Also, there may be embodiments when the ingress packet processor 230 performs edits as well.

The forwarding logic may be hard-coded and/or configurable, depending on the embodiment. For example, the forwarding logic of a device 200, or portions thereof, may, in some instances, be at least partially hard-coded into one or more ingress processors 230 and/or egress processors 250. As another example, the forwarding logic, or elements thereof, may also be configurable, in that the logic changes over time in response to analyses of state information collected from, or instructions received from, the various components of the device 200 and/or other nodes in the network in which the device 200 is located.

In an embodiment, a device 200 will typically store in its memories one or more forwarding tables (or equivalent structures) that map certain data unit attributes or characteristics to actions to be taken with respect to data units 205 having those attributes or characteristics, such as sending a data unit 205 to a selected path, or processing the data unit 205 using a specified internal component. For instance, such attributes or characteristics may include a Quality-of-Service level specified by the data unit 205 or associated with another characteristic of the data unit 205, a flow control group, an ingress port 210 through which the data unit 205 was received, a tag or label in a packet's header, a source address, a destination address, a packet type, or any other suitable distinguishing property. A traffic manager 240 may, for example, implement logic that reads such a table, determines one or more ports 290 to send a data unit 205 to based on the table, and sends the data unit 205 to an egress processor 250 that is coupled to the one or more ports 290.

According to an embodiment, the forwarding tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g., are directed to, etc.) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, forwarding logic may read port state data for ports 210/290. Port state data may include, for instance, flow control state information describing various traffic flows and associated traffic flow control rules or policies, link status information indicating links that are up or down, port utilization information indicating how ports are being utilized (e.g., utilization percentages, utilization states, etc.). Forwarding logic may be configured to implement the associated rules or policies associated with the flow(s) to which a given packet belongs.

As data units 205 are routed through different nodes in a network, the nodes may, on occasion, discard, fail to send, or fail to receive certain data units 205, thus resulting in the data units 205 failing to reach their intended destination. The act of discarding of a data unit 205, or failing to deliver a data unit 205, is typically referred to as "dropping" the data unit. Instances of dropping a data unit 205, referred to herein as "drops" or "packet loss," may occur for a variety of reasons, such as resource limitations, errors, or deliberate policies. Different components of a device 200 may make the decision to drop a data unit 205 for various reasons. For instance, a traffic manager 240 may determine to drop a data unit 205 because, among other reasons, buffers are overutilized, a queue is over a certain size, and/or a data unit 205 has a certain characteristic.

2.10. Multi-Bank FIFO

Figure 3A:
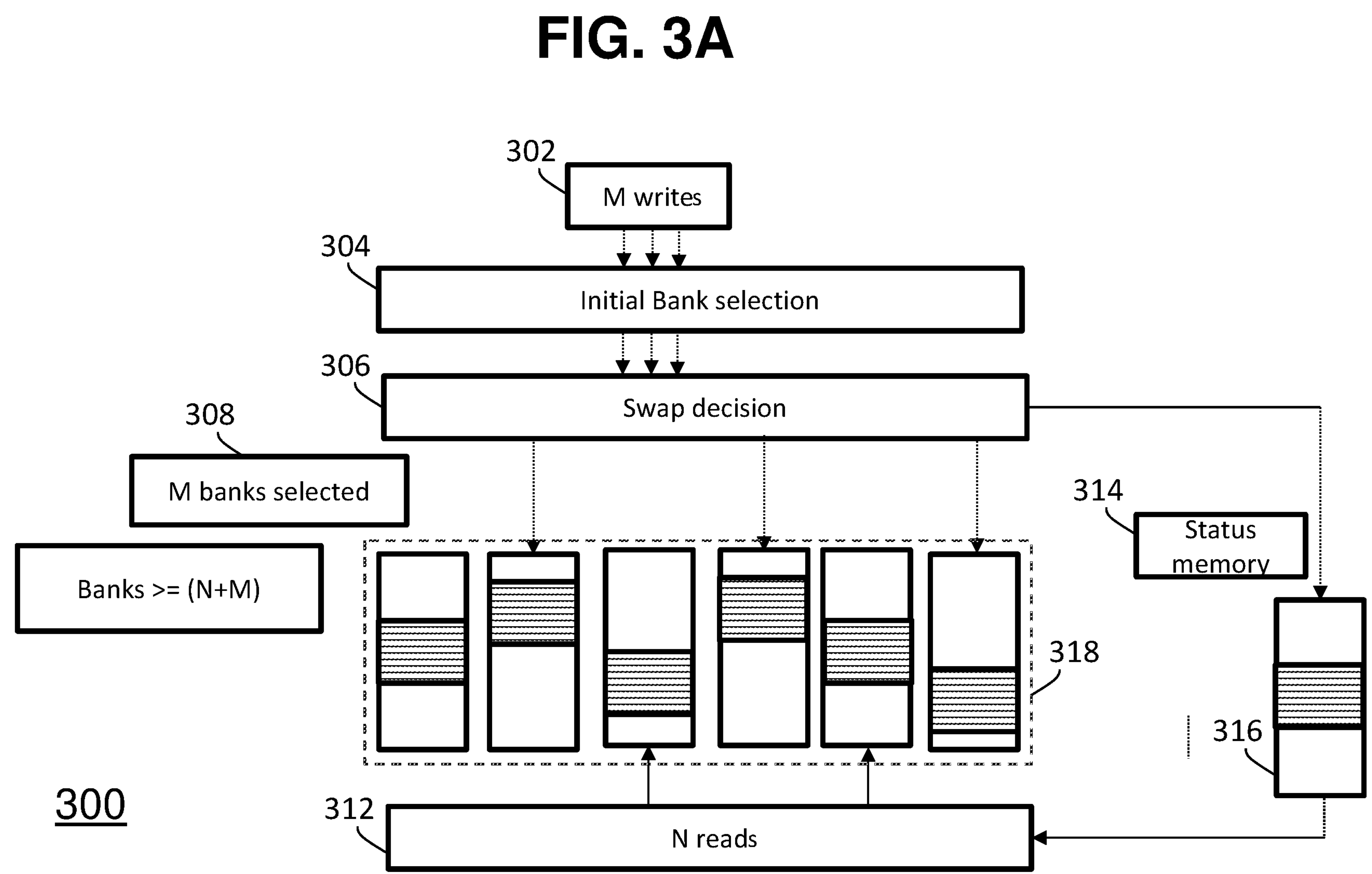
FIG. 3A and FIG. 3B illustrate example system configurations in which multi-bank FIFOs operate with processing blocks or logics to support FIFO operations.

FIG. 3A and FIG. 38 illustrate example system configurations 300 and 300-1 in which multi-bank FIFOs 318 and 318-1 operate with a number of processing blocks or logics to support FIFO operations. In some operational scenarios, some or all of these modules, devices, systems, etc., in FIG. 3A or FIG. 3B may be in part or in whole implemented by a network or packet switch device as described herein. Each block, module, device, system, etc., illustrated in the multi-bank FIFO 300 may be collectively or individually implemented with one or more components, sub-systems or devices that comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

Figure 3B:
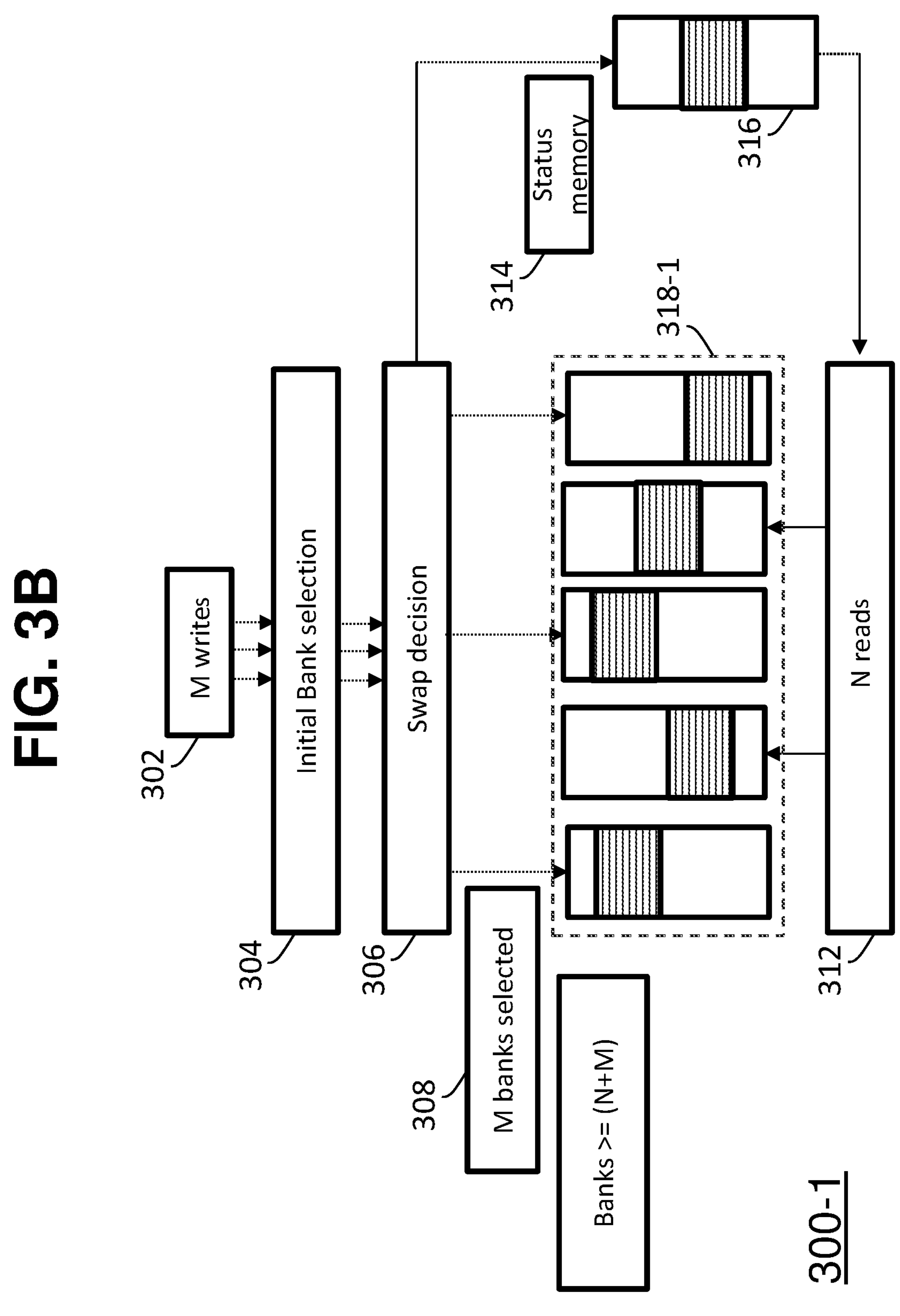

A multi-bank FIFO (e.g., 318 of FIG. 3A, 318-1 of FIG. 3B, etc.) as described herein may be made up of multiple banks each with multiple bank memories or memory entries. As illustrated in FIG. 3A and FIG. 3B, the multi-bank FIFO 318 of FIG. 3A comprises six (6) memory banks, whereas the multi-bank FIFO 318-1 of FIG. 3B comprises five (5) memory banks. In various operational scenarios, the same or similar processing blocks or logics as illustrated in FIG. 3A and/or FIG. 3B may operate with a multi-bank FIFO having fewer or more memory banks than those of the multi-bank FIFO 318 and/or 38-1 as illustrated in FIG. 3A and/or FIG. 3B.

In some operational scenarios, each of the memory banks in the multi-bank FIFO may be a single port memory (bank)—only a (e.g., single, etc.) write or read may be performed or supported with the memory bank in a given clock cycle.

Across the multiple banks in the multi-bank FIFO, in the same reference clock cycle, reads to memory banks in the multi-bank FIFO is given priority over writes to the memory banks in the multi-bank FIFO. Hence, if a read is to be performed with a bank in the multi-bank FIFO in a given clock cycle, the same bank cannot be used or will be excluded for a write in the same clock cycle.

To support queuing and dequeuing FIFO data elements in the first-in first-out order, FIFO data entries or portions thereof from the multi-bank FIFO may be read in the same order used to write these FIFO data entries or portions into the multi-bank FIFO. Additionally, optionally or alternatively, each memory bank in the multi-bank FIFO itself may also operate as a (component) FIFO. More specifically, FIFO data entries or portions thereof stored in (e.g., adjacent, etc.) memory entries/rows of a memory bank in the multi-bank FIFO are read in the same order used to write these FIFO data entries or portions into the memory entries/rows of the memory bank. Hence, in these operational scenarios, the multi-bank FIFO operates as a FIFO of FIFOs, that is, built upon multiple FIFOs in the multiple memory banks of the multi-bank FIFO.

The multiple banks in the multi-bank FIFO may be sequentially ordered—e.g., along a canonical order such as an ascending bank index/number order, etc.—using bank indexes/numbers. For example, the multi-bank FIFO 318 of FIG. 3A has six (6) banks, which may be respectively indexed, identified or sequentially ordered as Bank 0, Bank 1, . . . . Bank 4, Bank 5 from right to left. Similarly, the multi-bank FIFO 318-1 of FIG. 3A has five (5) banks, which may be respectively indexed, identified or sequentially ordered as Bank 0, Bank 1, . . . . Bank 4 from right to left.

The multi-bank FIFO can support M writes (302 of FIG. 3A or FIG. 3B) and N reads (312 of FIG. 3A or FIG. 3B) in each (or any given) reference clock cycle, where each of M and N is an integer no less than one (0), and the total write/read accesses (M+N) is less than T—here, T represents the total number of banks in the multi-bank FIFO. In some operational scenarios, both M and N are integers greater than one (1). In some operational scenarios, M is greater or no less than N in any given clock cycle. In some operational scenarios, M is a variable from 0 to T−N.

As the memory banks may be single-port memory banks, each of M writes and N reads supported in a single clock cycle may be directed to a different bank in a plurality of banks in the multi-bank FIFO. To support (M+N) write and/or read operations, the minimum total number of banks in the multi-bank FIFO is M+N. By way of example but not limitation, as illustrated in FIG. 3A, the multi-bank FIFO 318 has six (6) banks, which therefore may be used to perform M=3 writes and N=3 reads in a single reference clock cycle. Similarly, the multi-bank FIFO 318-1 of FIG. 3A has five (5) banks, which may be used to perform M=3 writes and N=2 reads in a single reference clock cycle.

In this single reference clock cycle, the M writes may be performed concurrently along a canonical order such as an ascending bank index/number order or along a non-canonical order in which bank swapping is implemented by a swap decision 306. Similarly, the N reads may be performed concurrently along a canonical order such as an ascending bank index/number order or along a non-canonical order in which bank swapping is implemented by the swap decision 306.

In some operational scenarios, no two of the M writes in the same clock cycle are directed to the same bank in the multi-bank FIFO. Rather, any two different writes in the same clock cycle may write or store FIFO data into two different (e.g., adjacent, ordered, etc.) banks in the multi-bank FIFO. Similarly, no two of the N reads in the same clock cycle are directed to the same bank in the multi-bank FIFO. Rather, any two different reads in the same clock cycle may read from FIFO data stored in two different (e.g., adjacent, ordered, etc.) banks in the multi-bank FIFO.

As noted, one or more reads in any given clock cycle respectively directed to one or more specific banks in the multi-bank FIFO may be given or performed with guaranteed access to the one or more specific banks. In comparison, any writes in the same given clock cycle may be directed to bank(s) that are specifically chosen to avoid the one or more specific banks to which the one or more reads in the same clock cycle are respectively directed. As a result, the (e.g., M, etc.) writes are performed with no conflict with the (e.g., N, etc.) reads in the same clock cycle in terms of banks to which these read/write are respectively directed.

The term "write cycle" may be used to refer to a reference clock cycle at which at least one write is performed. Likewise, the term "read cycle" may be used to refer to a reference clock cycle at which at least one read is performed. A reference clock cycle may be both a write cycle and a read cycle if both write(s) and read(s) are performed. Not all reference clock cycles are write cycles; for example, some reference clock cycle may not have any writes. Similarly, not all reference clock cycles are read cycles; for example, some reference clock cycles may not have any reads. Additionally, optionally or alternatively, some reference clock cycles may not have any read or write performed.

Two sequential or consecutive write cycles may or may not be two time sequential or consecutive reference clock cycles, as the two sequential write cycles may be separated by zero or more non-write reference clock cycles. The one or more non-write reference clock cycles here may be reference clock cycles in which no write is performed. Similarly, two sequential or consecutive read cycles may or may not be two time sequential or consecutive reference clock cycles, as the two sequential write cycles may be separated by zero or more non-read reference clock cycles. The one or more non-read reference clock cycles here may be reference clock cycles in which no read is performed.

The information of which banks FIFO data portions (e.g., of one or more FIFO entries/rows, of a FIFO data burst, etc.) have been written in any given write cycle is captured in status memory 314 stored in a status matrix 316 separate from the banks of the multi-bank FIFO. The status memory 314 may be stored as an entry/row in the status matrix 316 and have a bit-vector in which a bit value of 1 in a bit corresponding to a respective bank of the banks in the multi-bank FIFO indicates that the respective bank stores a FIFO data portion in the write cycle.

Figure 4A:
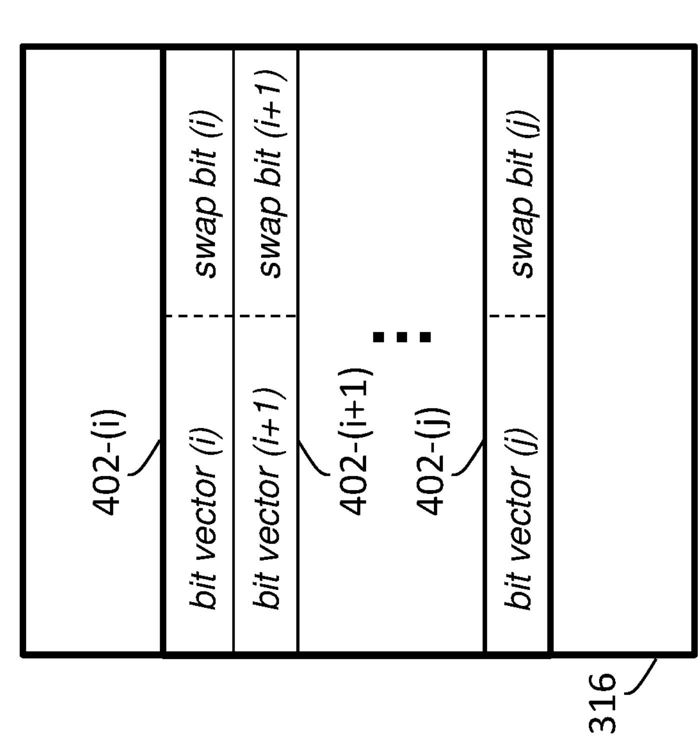
FIG. 4A illustrates an example status matrix.

As illustrated in FIG. 4A, the status matrix 316 may include a plurality of status memory entries or rows such as . . . 402-(*i*), 402-(*i*+1), . . . 402-(*j*), etc., that may be written by the system or the swap decision 306 therein for a plurality of write cycles. Each status memory entry or row in the plurality of status memory entries corresponds to a respective write cycle in the plurality of write cycles. Adjacent status memory entries or rows—for example, 402-(*i*) and 402-(*i*+1)—may be written by the system or the swap decision 306 therein for adjacent write cycles.

Each status memory entry or row 402 in the status matrix 316 may include a bit vector and a swap bit for a corresponding write cycle. The bit vector includes a total number of bits equaling to the total number of banks in the multi-bank FIFO.

Each bit in the bit vector (e.g., bit vector (i), etc.) corresponds to—and indicates a selection or non-selection of—a respective bank in the banks of the multi-bank FIFO for the write cycle. For example, the rightmost bit in the bit vector corresponds to—and indicates a selection or non-selection of—the rightmost bank in the banks of the multi-bank FIFO for the write cycle. The next rightmost bit in the bit vector corresponds to—and indicates a selection or non-selection of—the next rightmost bank in the banks of the multi-bank FIFO for the write cycle . . . . The leftmost bit in the bit vector corresponds to—and indicates a selection or non-selection of—the leftmost bank in the banks of the multi-bank FIFO for the write cycle.

The swap bit in the bit vector (e.g., bit vector (i) in the present example, etc.) indicates whether a swapping decision (of swapping the first two banks initially selected by an initial selection 304) is positively made for the write cycle to which the bit vector corresponds.

2.11. Miscellaneous

Device 200 or multi-bank FIFOs along with attendant processing logics or blocks as illustrated in FIG. 3A and FIG. 3B therein illustrate only one of many possible arrangements of devices or schedulers configured to provide the functionality described herein. Other arrangements may include fewer, additional, or different components, and the division of work between the components may vary depending on the arrangement. Moreover, in an embodiment, the techniques described herein may be utilized in a variety of computing contexts other than within a network 100.

Furthermore, figures herein illustrate but a few of the various arrangements of memories that may be utilized to implement the described buffering or FIFO techniques. Other arrangements may include fewer or additional elements in varying arrangements.

3.0. FUNCTIONAL OVERVIEW

Described in this section are various example method flows or operations for implementing various features of the systems and system components described herein. The example method flows are non-exhaustive. Alternative method flows and flows for implementing other features will be apparent from the disclosure.

The various elements of the process flows or operations described below may be performed in a variety of systems. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Successive Write Cycles

Under techniques as described herein, the very first bank finally selected for current writes in a current write cycle may not conflict with—or may not be the same as—the very last bank actually selected for previous writes during a previous write cycle immediately preceding the current write cycle. In some operational scenarios, the immediately preceding write cycle and the current write cycle may be two time sequential or consecutive reference clock cycles. In some other operational scenarios, the immediately preceding write cycle and the current write cycle may not be two time sequential or consecutive reference clock cycles.

This is to prevent two time sequential writes—e.g., the last write directed to the last bank of the previous writes in the immediately preceding write cycle and the first write directed to the first bank of the current writes in the current write cycle—are directed to the same bank in the multi-bank FIFO. Otherwise, if the two time sequential writes were allowed to write to the same bank, then subsequent reads in subsequent read cycles would not be able to perform reads in parallel with data portions stored into the same bank by the (earlier) two time sequential writes.

Under some approaches, the last bank of the previous writes in the previous write cycle may be removed or prevented from being selected by the current writes in the current write cycle. However, that would mean that an extra bank is needed to support M+N write and read operations in the same reference clock cycle. More specifically, under these approaches, M writes in a clock cycle might start with the rightmost bank to the leftmost bank. The last bank of the previous writes in a previous write cycle might be memorized and used to avoid being the first bank of the next writes in the next write cycle from going to the same bank. However, if the last bank of previous writes were avoided in the next write cycle, that means the last bank would not be fully utilized as the last bank could not be available to be used as a writable bank in the next write cycle.

In comparison, techniques as described herein can be implemented to fully utilize all the banks available in the multi-bank FIFO for supporting maximum M+N write and read operations in any given clock cycle. Under these techniques, while the very first write in the next write cycle does not go to—or is constrained not to use—the very last bank in the previous write cycle, the bank initially selected for the second write can be swapped with the bank initially selected for the first write; hence, the second write in the current write cycle can go to—or make use of—the last bank in the previous write cycle. This swapping of the banks initially selected for the first two writes helps avoid or prevent two successive writes in two successive clock cycles from going into the same bank. In addition, as the last write of the previous write cycle and the first write of the current write cycle go to different banks, two subsequent reads to perform with respect to FIFO data portions written by these writes can also be performed in a single read cycle, even if the memory banks in the multi-bank FIFO may be single-port banks.

3.2. Swap Decision

As illustrated in FIG. 3A or FIG. 3B, after an initial bank selection 304 is made, a swap decision 306 is executed to determine whether the very first bank initially selected for current writes in a current write cycle is the same as the very last bank actually selected for previous writes during a previous write cycle immediately preceding the current write cycle.

In response to determining that the first bank initially selected in the current write cycle is not the same as the last bank in the previous write cycle, a system as described herein—e.g., a network switch or a packet processing component therein operating with the multi-bank FIFO, etc.—can proceed to use initially selected banks as determined by the initial bank selection 304 to carry out or perform the current writes along the canonical (memory bank) order such as the ascending bank index/number order, from the rightmost to the leftmost, etc.

On the other hand, in response to determining that the first bank initially selected in the current write cycle is the same as the last bank in the previous write cycle, the system or the swap decision 306 implemented therein can swap the first bank initially selected with the second bank initially selected to generate a new or non-canonical (memory bank) order different from the canonical order. In the non-canonical order, any other initially selected banks other than the initially selected first and second banks as determined by the initial bank selection 304 may remain in their previous places in the non-canonical order as in the canonical order. In other words, the non-canonical order with a positive swapping decision differs from the canonical order in that the second bank initially selected becomes the first bank finally selected whereas the first bank initially selected becomes the second bank finally selected.

It may be noted that the swapped banks in the non-canonical (memory bank) order here may or may not be adjacent in terms of bank indexes/numbers. The swapped banks may or may not be separated by other banks not selected for writes in that clock cycle.

Once the swap decision is positively made, the system can proceed to use initially selected banks determined by the initial bank selection 304 to carry out or perform the current writes along the non-canonical (memory bank) order with the initially selected first two banks swapped.

3.3. Data Burst and Chunks

A write data burst—e.g., a FIFO entry or queue element, 1024 bytes, 2048 bytes, etc.—may be partitioned or broken into one or more relatively small FIFO data chunks each of which has a size no greater than a size of a memory entry (or a memory row) in a memory bank of the multi-bank FIFO such as 128 bytes, 256 bytes, etc. Each chunk of the write data burst is written to a separate memory entry in a separate bank in the multi-bank FIFO in a given clock cycle. In some operational scenarios, the number of chunks for a FIFO entry or element may be greater than the number of writes supported in a clock cycle; hence, such a data burst may be stored into the multi-bank FIFO in consecutive clock cycles.

By way of example but not limitation, multiple FIFO data portions such as M FIFO data chunks may be partitioned from one or more to-be-stored FIFO entries and stored into the FIFO in the current write cycle with M writes 302. The initial bank selection 304 may generate an M banks selection 308. The M banks in the selection 308 are selected with one or more bank selection algorithms (e.g., round robin, randomly, based on memory utilizations of the banks, etc.) from among all the banks in the multi-bank FIFO excluding any banks targeted by any reads (e.g., N reads 312, etc.) in the same reference clock cycle to which the current write cycle correspond. Any bank which is full is not available for allocation in the M bank selection 308.

The very first FIFO data chunk among the M FIFO data chunks may be stored with the very first write in M writes 302 into the finally selected first bank as determined by the swap decision 306. The second FIFO data chunk among the M FIFO data chunks may be stored with the second write immediately following the first write in the M writes 302 into the finally selected second bank as determined by the swap decision 304.

3.4. Status Memory and Matrix

To facilitate subsequent reads of FIFO entries stored in the multi-bank FIFO, for each (current) write cycle, the system or the swap decision 306 may generate a (current) status memory entry or row 314 for (current) writes in the (current) write cycle and store the (current) status memory entry or row 314 in a status matrix 316.

By way of status memory entries or rows (e.g., 314, etc.), the status matrix 316 stores a respective overall status of banks to which memory entries are written for each write cycle. Each (status memory) entry or row in the status matrix 316 represents that writes occurred and stores a bit vector representing the final banks chosen or selected (e.g., by the swap decision 306, etc.) for each write cycle and includes (T+1) bits, of which T bits represent individual bank specific statuses for the T banks in the multi-bank FIFO whereas the additional one bit represents a swap bit.

In other words, for a given reference clock cycle that is a write cycle, a status memory entry or row 314 as described herein may comprise a bit vector to indicate (e.g., 0 or 1, false or true, etc.) which banks are selected by the initial bank selection 304 for the write cycle and a swap bit—in addition to the bit vector—to indicate (e.g., 0 or 1, false or true, etc.) whether the first two banks in the initially selected by the initial bank selection 304 have been swapped by the swap decision 306 for the write cycle.

The bit vector in the status memory entry or row 314 has a plurality of bits whose total number equals the total number of banks in the multi-bank FIFO. Each bit in the plurality of bits corresponds to a respective bank in a plurality of banks in the multi-bank FIFO and indicates (e.g., 0 or 1, false or true, etc.) whether the respective bank has been initially selected in the write cycle.

Status memory entries or rows stored in the status matrix 316 may be ordered or written by FIFO write operations time sequentially, for example from top to bottom corresponding to the time direction. Likewise, status memory entries or rows stored in the status matrix 316 may be read out by FIFO read operations time sequentially, for example from top to bottom corresponding to the same time direction. As a result, FIFO data entries are queued and dequeued from the multi-bank FIFO 318 of FIG. 3A or 318-1 of FIG. 3B in the first-in first-out order.

3.5. Writes with No Conflict

FIG. 4B illustrates an example table describing or summarizing operational scenarios in which a multi-bank FIFO such as 318 of FIG. 3A or 318-1 of FIG. 3B may be used to store/write or retrieve/read FIFO data bursts, entries or portions in different reference clock cycles representing different write/read cycles. Three rows in the table of FIG. 4B respectively correspond to three sequentially ordered reference clock cycles 1, 2 and 3 as indicated in the leftmost column.

For the purpose of illustration only, reference clock cycles 1, 2 and 3 represented in the three rows of the table of FIG. 4B are consecutive reference clock cycles. It should be noted that, in various operational scenarios, any two reference clock cycles represented in the adjacent rows of the table of FIG. 4B may or may not be separated by one or more other reference clock cycles in which no write or read operations with respect to the multi-bank FIFO occur.

For the purpose of illustration only, the multi-bank FIFO includes six (memory) banks such as 318 illustrated in FIG. 3A. It should be noted that, in various operational scenarios, fewer or more banks may be included in a multi-bank FIFO as described herein.

As illustrated in FIG. 3A, the six banks of the multi-bank FIFO 318 may be ordered or indexed from the rightmost to the leftmost or from 0 to 5.

At reference clock cycle 1, which is both a read cycle and a write cycle, two reads (e.g., N=2 in 312 of FIG. 3A, etc.) are respectively directed to banks 2 and 4 of the multi-bank FIFO, as indicated in the first row second column of the table of FIG. 4B. The two reads may seek to retrieve earlier written FIFO data portions (e.g., packet data, packet control data, etc.) from a first memory entry of bank 2 and a second memory entry of bank 4.

Given that the reads are given or assigned priorities higher than writes, banks 2 and 4 directed to by the two reads are excluded from being available as candidate banks for writing any incoming FIFO data (e.g., of one or more FIFO bursts or entries, etc.) in the same reference clock cycle into the multi-bank FIFO 318. This gives rise to four available or candidate banks after read bank removal: 0, 1, 3 and 5 as indicated in the first row third column of the table of FIG. 4B.

In the present example, three writes (M=3 in 302 of FIG. 3A) of FIFO data portions are to be made in reference clock cycle 0 represented in the first row of the table of FIG. 4B. It should be noted that, in various operational scenarios, fewer or more operations may be supported in a reference clock cycle by a multi-bank FIFO, depending on the total number of banks, the total number of reads, etc.

A system as described herein—a network switch or a packet processing component therein—may invoke an initial bank selection 304 to select three banks, namely banks 0, 1 and 5 as indicated in the first row fourth column of the table of FIG. 4B, from the four available banks 0, 1, 3 and 5. To initially select these three banks from the available banks, the initial bank selection 304 may implement or perform one or more bank selection methods based on bank selection factors, which may include, but are not necessarily limited to only, any of: round-robin, least recently used, bank utilizations/occupancies, bank capacities, load balancing, etc.

In response to determining the initial bank selection in or for reference clock cycle 1, the system proceed to invoke a swap decision (block/logic) 306 to determine whether a swap decision is to be positively made with respect to the first two initially selected banks 0 and 1.

The swap decision 306 compares the first initially selected bank of the present write cycle, namely bank 0 of the reference clock cycle 1 as indicated in the first row fifth column of the table of FIG. 4B, with the last (finally) selected bank of a specific previous write cycle—the last write cycle—immediately before the present write cycle.

For the purpose of illustration, there is no specific previous write cycle—e.g., reference clock cycle 1 may be the very first write cycle among a plurality of write cycles to the multi-bank FIFO 318. Hence, the last (finally) selected bank may be either undefined or set to a default value. In response to determining that the last (finally) selected bank is undefined or that the first initially selected bank (0) of the present write cycle is different from the last (finally) selected bank if defined, the swap decision for the reference clock cycle 1 is negative; in other words, the first two initially selected banks (0 and 1) need not be swapped in the reference clock cycle 1.

The swap decision 306 generates a first bit vector (100011) representing the initially selected banks, as indicated in the first row sixth column of the table of FIG. 4B, as a part of status memory (entry or row) for reference clock cycle 1. The first bit vector includes six (6) bits respectively corresponding to the six banks in the multi-bank FIFO 318 with the rightmost bit corresponding to the rightmost bank, the next rightmost bit corresponding to the next rightmost bank, and so on. The swap decision 306 sets a bit value of 0 for each bank that is not initially selected and a bit value of 1 for each bank that is initially selected.

In addition, the swap decision 306 generates a first swap bit (0) representing the negative swap decision, as indicated in the first row seventh column of the table of FIG. 4B, as another part of status memory (entry or row) for reference clock cycle 1.

To facilitate correct later reading of the FIFO data portions written in reference clock cycle 1, the swap decision 306 writes the first bit vector and the first swap bit for reference clock cycle 1 in the status matrix 316, which may be separate from the banks of the multi-bank FIFO. The system also caches or maintains the last finally selected bank (5 in the present example) for reference clock cycle 1 in a memory or cache accessible to the swap decision 306.

For the purpose of illustration, reference clock cycle 2 may be a write cycle immediately following the last write cycle represented by reference clock cycle 1. At reference clock cycle 2, which is also both a read cycle and a write cycle, two reads (e.g., N=2 in 312 of FIG. 3A, etc.) are respectively directed to banks 4 and 5 of the multi-bank FIFO, as indicated in the second row second column of the table of FIG. 4B. The two reads may seek to retrieve earlier written FIFO data portions (e.g., packet data, packet control data, etc.) from a third memory entry of bank 4 and a fourth memory entry of bank 5.

Given that the reads are given or assigned priorities higher than writes, banks 4 and 5 directed to by the two reads are excluded from being available as candidate banks for writing any incoming FIFO data (e.g., of one or more FIFO bursts or entries, etc.) in the same reference clock cycle into the multi-bank FIFO 318. This gives rise to four available or candidate banks after read bank removal: 0, 1, 2 and 3 as indicated in the second row third column of the table of FIG. 4B.

Three writes (M=3 in 302 of FIG. 3A) of FIFO data portions are to be made in reference clock cycle 2 represented in the second row of the table of FIG. 4B.

The system may invoke the initial bank selection 304 to select three banks, namely banks 0, 1 and 2 as indicated in the second row fourth column of the table of FIG. 4B, from the four available banks 0, 1, 2 and 3. As noted, the bank selection methods may be implemented or performed based on bank selection factors, which may include, but are not necessarily limited to only, any of: round-robin, least recently used, bank utilizations/occupancies, bank capacities, load balancing, etc.

In response to determining the initial bank selection in or for reference clock cycle 2, the system proceed to invoke the swap decision (block/logic) 306 to determine whether a swap decision is to be positively made with respect to the first two initially selected banks 0 and 1.

The swap decision 306 compares the first initially selected bank of the present write cycle, namely bank 0 of the reference clock cycle 2 as indicated in the second row fifth column of the table of FIG. 4B, with the last (finally) selected bank of a specific previous write cycle—the last write cycle or reference clock cycle 1—immediately before the present write cycle.

In the last write cycle, the last (finally) selected bank is bank 5 as indicated in the first row eighth column of the table of FIG. 4B. Since the first initially selected bank (0) of the present write cycle is different from the last (finally) selected bank (5), the swap decision for the reference clock cycle 2 is negative; in other words, the first two initially selected banks (0 and 1) need not be swapped in the reference clock cycle 2.

The swap decision 306 generates a second bit vector (000111) representing the initially selected banks, as indicated in the second row sixth column of the table of FIG. 4B, as a part of status memory (entry or row) for reference clock cycle 2. The second bit vector includes six (6) bits respectively corresponding to the six banks in the multi-bank FIFO 318 with the rightmost bit corresponding to the rightmost bank, the next rightmost bit corresponding to the next rightmost bank, and so on. The swap decision 306 sets a bit value of 0 for each bank that is not initially selected and a bit value of 1 for each bank that is initially selected.

In addition, the swap decision 306 generates a second swap bit (0) representing the negative swap decision, as indicated in the second row seventh column of the table of FIG. 4B, as another part of status memory (entry or row) for reference clock cycle 2.

To facilitate correct later reading of the FIFO data portions written in reference clock cycle 2, the swap decision 306 writes the second bit vector and the second swap bit for reference clock cycle 2 in the status matrix 316. The system also caches or maintains the last finally selected bank (2 in the present example) for reference clock cycle 2 in memory or cache accessible to the swap decision 306.

3.6. Writes with Conflict

For the purpose of illustration, reference clock cycle 3 may be a write cycle immediately following the last write cycle represented by reference clock cycle 2. At reference clock cycle 2, which is also both a read cycle and a write cycle, two reads (e.g., N=2 in 312 of FIG. 3A, etc.) are respectively directed to banks 0 and 1 of the multi-bank FIFO, as indicated in the third row second column of the table of FIG. 4B. The two reads may seek to retrieve earlier written FIFO data portions (e.g., packet data, packet control data, etc.) from a fifth memory entry of bank 0 and a sixth memory entry of bank 1.

Given that the reads are given or assigned priorities higher than writes, banks 0 and 1 directed to by the two reads are excluded from being available as candidate banks for writing any incoming FIFO data (e.g., of one or more FIFO bursts or entries, etc.) in the same reference clock cycle into the multi-bank FIFO 318. This gives rise to four available or candidate banks after read bank removal: 2, 3, 4 and 5.

Three writes (M=3 in 302 of FIG. 3A) of FIFO data portions are to be made in reference clock cycle 3 represented in the second row of the table of FIG. 4B.

The system may invoke the initial bank selection 304 to determine or generate three initially selected banks. For the purpose of illustration only, the system or the initial bank selection 304 may determine that bank 3 among banks 2, 3, 4 and 5 after read bank removal is also not available for selection. For example, bank 3 may be full. Hence, the remaining or final available banks for selection, banks 2, 4 and 5, is indicated in the third row third column of the table of FIG. 4B. As there are only three banks available for three writes, all available banks are included in the initial bank selection, namely banks 2, 4 and 5 as indicated in the third row fourth column of the table of FIG. 4B.

In response to determining the initial bank selection in or for reference clock cycle 3, the system proceed to invoke the swap decision (block/logic) 306 to determine whether a swap decision is to be positively made with respect to the first two initially selected banks 2 and 4.

The swap decision 306 compares the first initially selected bank of the present write cycle, namely bank 2 of the reference clock cycle 3 as indicated in the third row fifth column of the table of FIG. 4B, with the last (finally) selected bank of a specific previous write cycle—the last write cycle or reference clock cycle 2—immediately before the present write cycle.

In the last write cycle, the last (finally) selected bank is bank 2 as indicated in the second row eighth column of the table of FIG. 4B. Since the first initially selected bank (2) of the present write cycle is the same as the last (finally) selected bank (2), the swap decision for the reference clock cycle 3 is positive; in other words, the first two initially selected banks (2 and 4) need be swapped in the reference clock cycle 3.

The swap decision 306 generates a third bit vector (110100) representing the initially selected banks, as indicated in the third row sixth column of the table of FIG. 4B, as a part of status memory (entry or row) for reference clock cycle 3. The third bit vector includes six (6) bits respectively corresponding to the six banks in the multi-bank FIFO 318 with the rightmost bit corresponding to the rightmost bank, the next rightmost bit corresponding to the next rightmost bank, and so on. The swap decision 306 sets a bit value of 0 for each bank that is not initially selected and a bit value of 1 for each bank that is initially selected.

In addition, the swap decision 306 generates a third swap bit (1) representing the positive swap decision, as indicated in the third row seventh column of the table of FIG. 4B, as another part of status memory (entry or row) for reference clock cycle 3.

To facilitate correct later reading of the FIFO data portions written in reference clock cycle 3, the swap decision 306 writes the third bit vector and the third swap bit for reference clock cycle 3 in the status matrix 316. The system also caches or maintains the last finally selected bank (5 in the present example) for reference clock cycle 5 in memory or cache accessible to the swap decision 306.

3.7. Reading Operations

As illustrated in FIG. 4A, in write cycles, status memory entries or rows—such as . . . 402-(*i*), 402-(*i*+1), . . . 402-(*j*), etc.—may be generated and written or stored in the status matrix 316. In read cycles, these status memory entries or rows—including bit vectors and swap bits therein—in the status matrix 316 may be read. These entries or rows can be written into and read from the status matrix 316 in a FIFO order. In other words, a first temporal order used in write cycles to write these status memory entries or rows into the status matrix 316 is the same as, or corresponds to, a second temporal order used in read cycles to read the status memory entries or rows from the status matrix 316. It should be noted that a reference clock cycle as described herein may be both a write cycle and a read cycle as both write(s) and read(s) can happen in the same reference clock cycle.

Hence, the very first status memory entry or row written into the status matrix 316 is also the very first status memory entry or row read from the status matrix 316. The second status memory entry or row written into the status matrix 316 is also the second status memory entry or row read from the status matrix 316. And so on.

In an example, in a reference clock cycle representing a read cycle, a system as described herein can fetch or read a (current) status memory entry or row from the status matrix 316.

The system can use a (current) bit vector in the (current) status memory entry or row to determine which specific banks in the multi-bank FIFO 318 store FIFO data portions to be read or retrieved in the read cycle. These specific banks may be determined or identified-along a canonical order such as from the rightmost to leftmost, from the lowest bank number/index to the highest bank number/index-using the bit vector and may correspond to specific bits of the bit vector that each have a value of one (1).

In addition, the system can use a (current) swap bit in the (current) status memory entry or row to determine whether the first two banks of the specific banks along the canonical order are to be swapped based on the value of the swap bit.

In response to determining that the first two banks of the specific banks along the canonical order are to be swapped based on the value of the swap bit such as one (1), the specific banks can be sequentially ordered into a non-canonical order in which the first two banks of the specific banks are to be swapped and any other banks of the specific banks remain in their original positions (as in the canonical order) in the non-canonical order. The system can proceed to perform reads with respect to the specific banks along the non-canonical order.

In response to determining that the first two banks of the specific banks along the canonical order are not to be swapped based on the value of the swap bit such as one (1), the system can proceed to perform reads with respect to the specific banks along the canonical order.

In some operational scenarios, the system may enforce a maximum read threshold for each read cycle. For example, in response to determining that the total number of banks in the specific banks identified with the bit vector exceeds the maximum read threshold, the first banks in the specific banks for a total number of banks up to the maximum read threshold can be read in the (current) read cycle or the (current) reference clock cycle, while the remaining banks in the specific banks can be deferred or delayed to the next read cycle or the next reference clock cycle immediately following the (current) ready cycle or the (current) reference clock cycle.

In some operational scenarios, the system may combine some or all different banks from different write cycles into a single read cycle. For example, different banks up to a maximum total bank number (e.g., the same as the maximum read threshold, etc.) from two or more adjacent write cycles represented by two more adjacent status memory entries/rows in the status matrix 316 may be read in the same read cycle or the same reference clock cycle.

4.0. EXAMPLE EMBODIMENTS

Figure 5:
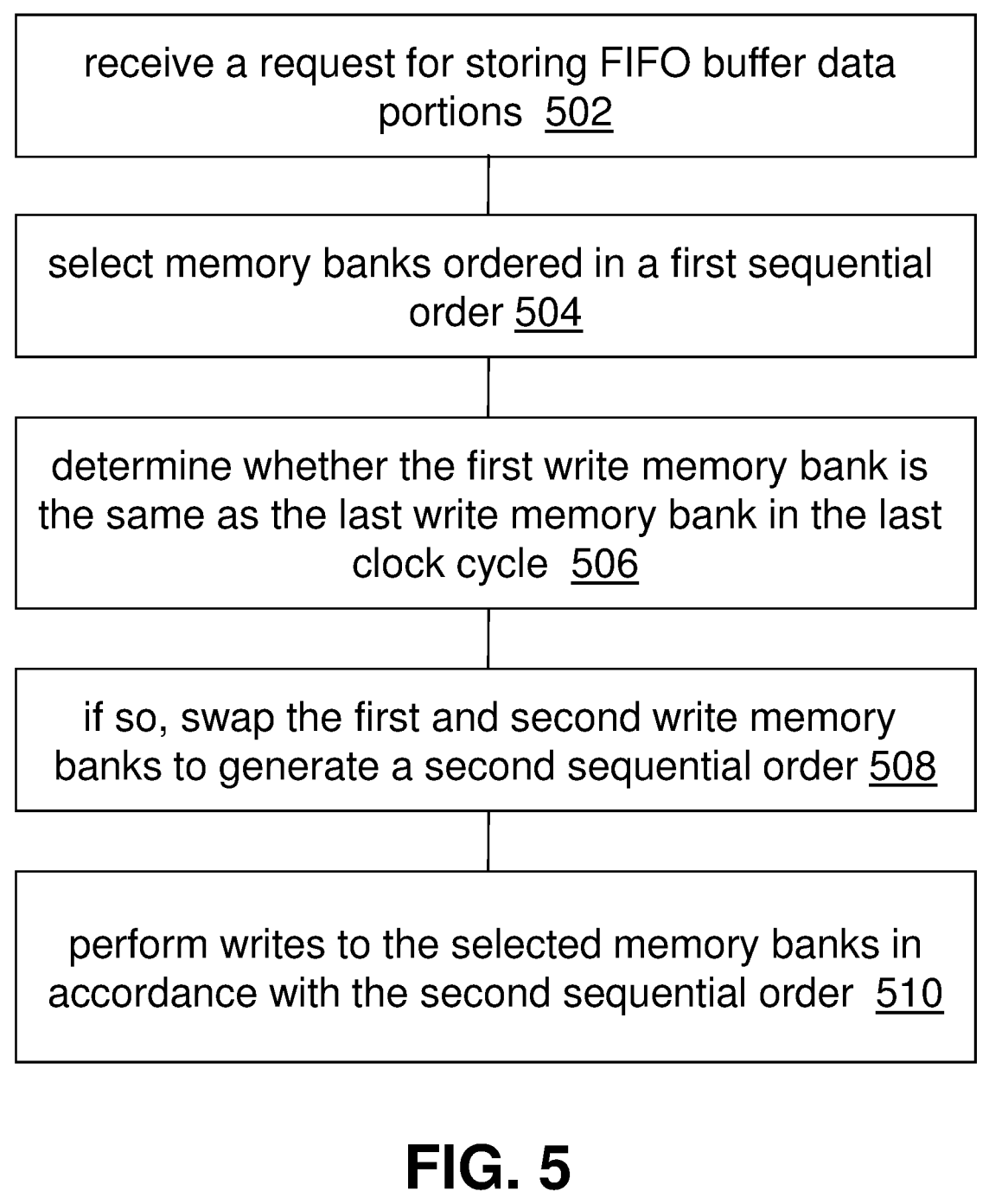

FIG. 5 illustrates an example process flow, according to an embodiment. The various elements of the flow described below may be performed by one or more computing devices. In block 502, a current clock cycle, a system as described herein receives a request for storing a set of first-in-first-out (FIFO) buffer data portions in a FIFO buffer implemented with a plurality of memory banks. The plurality of memory banks includes a plurality of sets of memory entries. Each memory bank in the plurality of memory banks includes a respective set of memory entries in the plurality of sets of multiple memory entries.

In block 504, in response to the request for storing the set of FIFO buffer data portions, the system applies one or more memory bank selection methods to select, from among the plurality of memory banks, a set of memory banks ordered in a first sequential order.

In block 506, the system determines whether the set of memory banks as ordered in the first sequential order starts with a first memory bank identical to a last memory bank written in a last clock cycle. The last clock cycle immediately precedes the current clock cycle. A last sequential order used to order a last set of memory banks selected for a last set of writes in the last clock cycle ends with the last memory bank.

In block 508, in response to determining that the set of memory banks as ordered in the first sequential order starts with the first memory bank identical to the last memory bank written in the last clock cycle, the system swaps the first memory bank with a second memory bank immediately following the first memory bank in the first sequential order to generate a second sequential order for the set of memory banks.

In block 510, the system performs a set of writes to store the plurality of FIFO buffer data portions into the set of memory banks in accordance with the second sequential order.

In an embodiment, the system is configured to further perform: generating a bit vector corresponding to the first sequential order along with a swap bit set to indicate that a swapping operation is performed to generate the second sequential order from the first sequential order.

In an embodiment, the system is configured to further perform: at one or more subsequent clock cycles after the current clock cycle, receiving a request for retrieving the set of FIFO buffer data portions in the FIFO buffer implemented with the plurality of memory banks; accessing the bit vector and the swap bit to determine whether the swap bit indicates that the swapping operation has been performed to generate the second sequential order from the first sequential order, the first sequential order being indicated with the bit vector; in response to determining that the swap bit indicates that the swapping operation has been performed to generate the second sequential order from the first sequential order, perform a set of reads to retrieve the set of FIFO buffer data portions from the set of memory banks in accordance with the second sequential order.

In an embodiment, the system is configured to further perform: generating a bit vector corresponding to the first sequential order along with a swapping bit set to indicate that a swapping operation is performed to generate the second sequential order from the first sequential order.

In an embodiment, each write in the set of writes stores a respective in the set of FIFO buffer data portions into a respective memory bank in the set of memory banks.

In an embodiment, a set of reads is performed in the current clock cycle to retrieve FIFO buffer data portions from a second set of memory banks in the plurality of memory banks; the one or more memory bank selection methods excludes each and every memory bank in the second set of memory banks from being selected into the set of memory banks used to perform the set of writes in the current clock cycle.

In an embodiment, the system is configured to further perform: at a second current clock cycle, receiving a second request for storing a second set of FIFO buffer data portions in the FIFO buffer implemented with the plurality of memory banks; in response to the second request for storing the second set of FIFO buffer data portions, applying the one or more memory bank selection methods to select, from among the plurality of memory banks, a second set of memory banks ordered in a third sequential order; determining whether the second set of memory banks as ordered in the third sequential order starts with a third memory bank identical to a previous memory bank written in a previous clock cycle, the previous clock cycle immediately preceding the second current clock cycle, a previous sequential order used to order a previous set of memory banks selected for a previous set of writes in the previous clock cycle ending with the previous memory bank; in response to determining that the second set of memory banks as ordered in the third sequential order starts with the third memory bank not identical to the previous memory bank written in the previous clock cycle, performing a second set of writes to store the second set of FIFO buffer data portions into the second set of memory banks in accordance with the third sequential order.

In an embodiment, a computing device such as a switch, a router, a line card in a chassis, a network device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

5.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

FIG. 6 is a block diagram that illustrates an example computer system 600 that may be utilized in implementing the above-described techniques, according to an embodiment. Computer system 600 may be, for example, a desktop computing device, laptop computing device, tablet, smartphone, server appliance, computing mainframe, multimedia device, handheld device, networking apparatus, or any other suitable device. In an embodiment, FIG. 6 constitutes a different view of the devices and systems described in previous sections.

Computer system 600 may include one or more ASICs, FPGAs, or other specialized circuitry 603 for implementing program logic as described herein. For example, circuitry 603 may include fixed and/or configurable hardware logic blocks for implementing some or all of the described techniques, input/output (I/O) blocks, hardware registers or other embedded memory resources such as random-access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 600 may include one or more hardware processors 604 configured to execute software-based instructions. Computer system 600 may also include one or more busses 602 or other communication mechanism for communicating information. Busses 602 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 600 also includes one or more memories 606, such as a RAM, hardware registers, or other dynamic or volatile storage device for storing data units to be processed by the one or more ASICs, FPGAs, or other specialized circuitry 603. Memory 606 may also or instead be used for storing information and instructions to be executed by processor 604. Memory 606 may be directly connected or embedded within circuitry 603 or a processor 604. Or, memory 606 may be coupled to and accessed via bus 602. Memory 606 also may be used for storing temporary variables, data units describing rules or policies, or other intermediate information during execution of program logic or instructions.

Computer system 600 further includes one or more read only memories (ROM) 608 or other static storage devices coupled to bus 602 for storing static information and instructions for processor 604. One or more storage devices 610, such as a solid-state drive (SSD), magnetic disk, optical disk, or other suitable non-volatile storage device, may optionally be provided and coupled to bus 602 for storing information and instructions.

A computer system 600 may also include, in an embodiment, one or more communication interfaces 618 coupled to bus 602. A communication interface 618 provides a data communication coupling, typically two-way, to a network link 620 that is connected to a local network 622. For example, a communication interface 618 may be an integrated services digital network (ISDN) card, cable modem, satellite modem, or a modem to provide a data communication connection to a corresponding type of telephone line. As another example, the one or more communication interfaces 618 may include a local area network (LAN) card to provide a data communication connection to a compatible LAN. As yet another example, the one or more communication interfaces 618 may include a wireless network interface controller, such as an 602.11-based controller, Bluetooth controller, Long Term Evolution (LTE) modem, and/or other types of wireless interfaces. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by a Service Provider 626. Service Provider 626, which may for example be an Internet Service Provider (ISP), in turn provides data communication services through a wide area network, such as the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

In an embodiment, computer system 600 can send and receive data units through the network(s), network link 620, and communication interface 618. In some embodiments, this data may be data units that the computer system 600 has been asked to process and, if necessary, redirect to other computer systems via a suitable network link 620. In other embodiments, this data may be instructions for implementing various processes related to the described techniques. For instance, in the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. As another example, information received via a network link 620 may be interpreted and/or processed by a software component of the computer system 600, such as a web browser, application, or server, which in turn issues instructions based thereon to a processor 604, possibly via an operating system and/or other intermediate layers of software components.

Computer system 600 may optionally be coupled via bus 602 to one or more displays 612 for presenting information to a computer user. For instance, computer system 600 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 612 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 612.

One or more input devices 614 are optionally coupled to bus 602 for communicating information and command selections to processor 604. One example of an input device 614 is a keyboard, including alphanumeric and other keys. Another type of user input device 614 is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Yet other examples of suitable input devices 614 include a touch-screen panel affixed to a display 612, cameras, microphones, accelerometers, motion detectors, and/or other sensors. In an embodiment, a network-based input device 614 may be utilized. In such an embodiment, user input and/or other information or commands may be relayed via routers and/or switches on a Local Area Network (LAN) or other suitable shared network, or via a peer-to-peer network, from the input device 614 to a network link 620 on the computer system 600.

As discussed, computer system 600 may implement techniques described herein using customized hard-wired logic, one or more ASICs or FPGAs 603, firmware and/or program logic, which in combination with the computer system causes or programs computer system 600 to be a special-purpose machine. According to one embodiment, however, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and use a modem to send the instructions over a network, such as a cable network or cellular network, as modulated signals. A modem local to computer system 600 can receive the data on the network and demodulate the signal to decode the transmitted instructions. Appropriate circuitry can then place the data on bus 602. Bus 602 carries the data to main memory 606, from which processor 604 retrieves and executes the instructions. The instructions received by main memory 606 may optionally be stored on storage device 610 either before or after execution by processor 604.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

at a current clock cycle, receiving a request for storing a set of first-in-first-out (FIFO) buffer data portions in a FIFO buffer implemented with a plurality of memory banks, wherein the plurality of memory banks includes a plurality of sets of memory entries; wherein each memory bank in the plurality of memory banks includes a respective set of memory entries in the plurality of sets of multiple memory entries;

in response to the request for storing the set of FIFO buffer data portions, applying one or more memory bank selection methods to select, from among the plurality of memory banks, a set of memory banks ordered in a first sequential order;

determining whether the set of memory banks as ordered in the first sequential order starts with a first memory bank identical to a last memory bank written in a last clock cycle, wherein the last clock cycle immediately precedes the current clock cycle, wherein a last sequential order used to order a last set of memory banks selected for a last set of writes in the last clock cycle ends with the last memory bank;

in response to determining that the set of memory banks as ordered in the first sequential order starts with the first memory bank identical to the last memory bank written in the last clock cycle, performing:

swapping the first memory bank with a second memory bank immediately following the first memory bank in the first sequential order to generate a second sequential order for the set of memory banks;

performing a set of writes to store the plurality of FIFO buffer data portions into the set of memory banks in accordance with the second sequential order.

2. The method of claim 1, further comprising: generating a bit vector corresponding to the first sequential order along with a swap bit set to indicate that a swapping operation is performed to generate the second sequential order from the first sequential order.

3. The method of claim 2, further comprising:

at one or more subsequent clock cycles after the current clock cycle, receiving a request for retrieving the set of FIFO buffer data portions in the FIFO buffer implemented with the plurality of memory banks;

accessing the bit vector and a swap bit to determine whether the swap bit indicates that the swapping operation has been performed to generate the second sequential order from the first sequential order, wherein the first sequential order is indicated with the bit vector;

in response to determining that the swap bit indicates that the swapping operation has been performed to generate the second sequential order from the first sequential order, perform a set of reads to retrieve the set of FIFO buffer data portions from the set of memory banks in accordance with the second sequential order.

4. The method of claim 1, further comprising: generating a bit vector corresponding to the first sequential order along with a swapping bit set to indicate that a swapping operation is performed to generate the second sequential order from the first sequential order.

5. The method of claim 1, wherein each write in the set of writes stores a respective in the set of FIFO buffer data portions into a respective memory bank in the set of memory banks.

6. The method of claim 1, wherein a set of reads is performed in the current clock cycle to retrieve FIFO buffer data portions from a second set of memory banks in the plurality of memory banks, wherein the one or more memory bank selection methods excludes each and every memory bank in the second set of memory banks from being selected into the set of memory banks used to perform the set of writes in the current clock cycle.

7. The method of claim 1, further comprising:

at a second current clock cycle, receiving a second request for storing a second set of FIFO buffer data portions in the FIFO buffer implemented with the plurality of memory banks;

in response to the second request for storing the second set of FIFO buffer data portions, applying the one or more memory bank selection methods to select, from among the plurality of memory banks, a second set of memory banks ordered in a third sequential order;

determining whether the second set of memory banks as ordered in the third sequential order starts with a third memory bank identical to a previous memory bank written in a previous clock cycle, wherein the previous clock cycle immediately precedes the second current clock cycle, wherein a previous sequential order used to order a previous set of memory banks selected for a previous set of writes in the previous clock cycle ends with the previous memory bank;

in response to determining that the second set of memory banks as ordered in the third sequential order starts with the third memory bank not identical to the previous memory bank written in the previous clock cycle, performing a second set of writes to store the second set of FIFO buffer data portions into the second set of memory banks in accordance with the third sequential order.

8. A system comprising:

one or more computing devices;

one or more non-transitory computer readable media storing instructions that, when executed by the one or more computing devices, cause performance of:

at a current clock cycle, receiving a request for storing a set of first-in-first-out (FIFO) buffer data portions in a FIFO buffer implemented with a plurality of memory banks, wherein the plurality of memory banks includes a plurality of sets of memory entries; wherein each memory bank in the plurality of memory banks includes a respective set of memory entries in the plurality of sets of multiple memory entries;

in response to the request for storing the set of FIFO buffer data portions, applying one or more memory bank selection methods to select, from among the plurality of memory banks, a set of memory banks ordered in a first sequential order;

determining whether the set of memory banks as ordered in the first sequential order starts with a first memory bank identical to a last memory bank written in a last clock cycle, wherein the last clock cycle immediately precedes the current clock cycle, wherein a last sequential order used to order a last set of memory banks selected for a last set of writes in the last clock cycle ends with the last memory bank;

in response to determining that the set of memory banks as ordered in the first sequential order starts with the first memory bank identical to the last memory bank written in the last clock cycle, performing:

swapping the first memory bank with a second memory bank immediately following the first memory bank in the first sequential order to generate a second sequential order for the set of memory banks;

performing a set of writes to store the plurality of FIFO buffer data portions into the set of memory banks in accordance with the second sequential order.

9. The system of claim 8, wherein the one or more non-transitory computer readable media storing instructions that, when executed by the one or more computing devices, cause further performance of: generating a bit vector corresponding to the first sequential order along with a swap bit set to indicate that a swapping operation is performed to generate the second sequential order from the first sequential order.

10. The system of claim 9, wherein the one or more non-transitory computer readable media storing instructions that, when executed by the one or more computing devices, cause further performance of:

at one or more subsequent clock cycles after the current clock cycle, receiving a request for retrieving the set of FIFO buffer data portions in the FIFO buffer implemented with the plurality of memory banks;

accessing the bit vector and a swap bit to determine whether the swap bit indicates that the swapping operation has been performed to generate the second sequential order from the first sequential order, wherein the first sequential order is indicated with the bit vector;

in response to determining that the swap bit indicates that the swapping operation has been performed to generate the second sequential order from the first sequential order, perform a set of reads to retrieve the set of FIFO buffer data portions from the set of memory banks in accordance with the second sequential order.

11. The system of claim 8, wherein the one or more non-transitory computer readable media storing instructions that, when executed by the one or more computing devices, cause further performance of: generating a bit vector corresponding to the first sequential order along with a swapping bit set to indicate that a swapping operation is performed to generate the second sequential order from the first sequential order.

12. The system of claim 8, wherein each write in the set of writes stores a respective in the set of FIFO buffer data portions into a respective memory bank in the set of memory banks.

13. The system of claim 8, wherein a set of reads is performed in the current clock cycle to retrieve FIFO buffer data portions from a second set of memory banks in the plurality of memory banks, wherein the one or more memory bank selection methods excludes each and every memory bank in the second set of memory banks from being selected into the set of memory banks used to perform the set of writes in the current clock cycle.

14. The system of claim 8, wherein the one or more non-transitory computer readable media storing instructions that, when executed by the one or more computing devices, cause further performance of:

at a second current clock cycle, receiving a second request for storing a second set of FIFO buffer data portions in the FIFO buffer implemented with the plurality of memory banks;

in response to the second request for storing the second set of FIFO buffer data portions, applying the one or more memory bank selection methods to select, from among the plurality of memory banks, a second set of memory banks ordered in a third sequential order;

determining whether the second set of memory banks as ordered in the third sequential order starts with a third memory bank identical to a previous memory bank written in a previous clock cycle, wherein the previous clock cycle immediately precedes the second current clock cycle, wherein a previous sequential order used to order a previous set of memory banks selected for a previous set of writes in the previous clock cycle ends with the previous memory bank;

in response to determining that the second set of memory banks as ordered in the third sequential order starts with the third memory bank not identical to the previous memory bank written in the previous clock cycle, performing a second set of writes to store the second set of FIFO buffer data portions into the second set of memory banks in accordance with the third sequential order.

15. One or more non-transitory computer readable media storing instructions that, when executed by one or more computing devices, cause performance of:

at a current clock cycle, receiving a request for storing a set of first-in-first-out (FIFO) buffer data portions in a FIFO buffer implemented with a plurality of memory banks, wherein the plurality of memory banks includes a plurality of sets of memory entries; wherein each memory bank in the plurality of memory banks includes a respective set of memory entries in the plurality of sets of multiple memory entries;

in response to the request for storing the set of FIFO buffer data portions, applying one or more memory bank selection methods to select, from among the plurality of memory banks, a set of memory banks ordered in a first sequential order;

determining whether the set of memory banks as ordered in the first sequential order starts with a first memory bank identical to a last memory bank written in a last clock cycle, wherein the last clock cycle immediately precedes the current clock cycle, wherein a last sequential order used to order a last set of memory banks selected for a last set of writes in the last clock cycle ends with the last memory bank;

in response to determining that the set of memory banks as ordered in the first sequential order starts with the first memory bank identical to the last memory bank written in the last clock cycle, performing:

swapping the first memory bank with a second memory bank immediately following the first memory bank in the first sequential order to generate a second sequential order for the set of memory banks;

performing a set of writes to store the plurality of FIFO buffer data portions into the set of memory banks in accordance with the second sequential order.

16. The media of claim 15, further storing instructions that, when executed by the one or more computing devices, cause further performance of: generating a bit vector corresponding to the first sequential order along with a swap bit set to indicate that a swapping operation is performed to generate the second sequential order from the first sequential order.

17. The media of claim 16, further storing instructions that, when executed by the one or more computing devices, cause further performance of:

at one or more subsequent clock cycles after the current clock cycle, receiving a request for retrieving the set of FIFO buffer data portions in the FIFO buffer implemented with the plurality of memory banks;

accessing the bit vector and a swap bit to determine whether the swap bit indicates that the swapping operation has been performed to generate the second sequential order from the first sequential order, wherein the first sequential order is indicated with the bit vector;

in response to determining that the swap bit indicates that the swapping operation has been performed to generate the second sequential order from the first sequential order, perform a set of reads to retrieve the set of FIFO buffer data portions from the set of memory banks in accordance with the second sequential order.

18. The media of claim 15, further storing instructions that, when executed by the one or more computing devices, cause further performance of: generating a bit vector corresponding to the first sequential order along with a swapping bit set to indicate that a swapping operation is performed to generate the second sequential order from the first sequential order.

19. The media of claim 15, wherein each write in the set of writes stores a respective in the set of FIFO buffer data portions into a respective memory bank in the set of memory banks.

20. The media of claim 15, wherein a set of reads is performed in the current clock cycle to retrieve FIFO buffer data portions from a second set of memory banks in the plurality of memory banks, wherein the one or more memory bank selection methods excludes each and every memory bank in the second set of memory banks from being selected into the set of memory banks used to perform the set of writes in the current clock cycle.

21. The media of claim 15, further storing instructions that, when executed by the one or more computing devices, cause further performance of:

at a second current clock cycle, receiving a second request for storing a second set of FIFO buffer data portions in the FIFO buffer implemented with the plurality of memory banks;

in response to the second request for storing the second set of FIFO buffer data portions, applying the one or more memory bank selection methods to select, from among the plurality of memory banks, a second set of memory banks ordered in a third sequential order;

determining whether the second set of memory banks as ordered in the third sequential order starts with a third memory bank identical to a previous memory bank written in a previous clock cycle, wherein the previous clock cycle immediately precedes the second current clock cycle, wherein a previous sequential order used to order a previous set of memory banks selected for a previous set of writes in the previous clock cycle ends with the previous memory bank;

in response to determining that the second set of memory banks as ordered in the third sequential order starts with the third memory bank not identical to the previous memory bank written in the previous clock cycle, performing a second set of writes to store the second set of FIFO buffer data portions into the second set of memory banks in accordance with the third sequential order.

* * * * *